US012749302B2

(12) United States Patent
Aoki et al.

(10) Patent No.: US 12,749,302 B2
(45) Date of Patent: Sep. 29, 2026

(54) INFORMATION PROCESSING APPARATUS, INFORMATION PROCESSING METHOD, AND SENSOR APPARATUS

(71) Applicant: SONY GROUP CORPORATION, Tokyo (JP)

(72) Inventors: Suguru Aoki, Tokyo (JP); Ryuta Satoh, Tokyo (JP); Kenji Suzuki, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 395 days.

(21) Appl. No.: 18/262,411

(22) PCT Filed: Dec. 3, 2021

(86) PCT No.: PCT/JP2021/044541
§ 371 (c)(1),
(2) Date: Jul. 21, 2023

(87) PCT Pub. No.: WO2022/163130
PCT Pub. Date: Aug. 4, 2022

(65) Prior Publication Data

US 2024/0078803 A1 Mar. 7, 2024

(30) Foreign Application Priority Data

Jan. 29, 2021 (JP) ................................ 2021-013994

(51) Int. Cl.
*G06V 10/98* (2022.01)
*G06T 7/00* (2017.01)
(Continued)

(52) U.S. Cl.
CPC ............. *G06V 10/98* (2022.01); *G06V 10/12* (2022.01)

(58) Field of Classification Search
CPC ........ G06V 10/98; G06V 10/12; G06V 10/82; G06V 20/56; G06T 7/00; H04N 7/18; H04N 23/60
See application file for complete search history.

(56) References Cited

U.S. PATENT DOCUMENTS

| | | | | |
|---|---|---|---|---|
| 7,672,022 | B1 * | 3/2010 | Fan | G06V 30/18105 358/448 |
| 2008/0075378 | A1 | 3/2008 | Kim | |
| 2024/0056556 | A1 * | 2/2024 | Aoki | G06T 1/00 |

FOREIGN PATENT DOCUMENTS

| | | | |
|---|---|---|---|
| JP | 6635221 | B1 | 1/2020 |
| JP | 2020149358 | A | 9/2020 |

(Continued)

OTHER PUBLICATIONS

International Search Report and Written Opinion of PCT Application No. PCT/JP2021/044541, issued on Feb. 15, 2022, 13 pages of ISRWO.

*Primary Examiner* — Gregory A Morse
*Assistant Examiner* — Ronde Lee Miller
(74) *Attorney, Agent, or Firm* — CHIP LAW GROUP

(57) ABSTRACT

There is provided an information processing apparatus which includes a recognition processing section that performs object recognition processing on sensor information from a sensor section by use of a trained machine learning model, a causal analysis section that analyzes the cause of a result of recognition by the recognition processing section on the basis of the sensor information from the sensor section and the result of recognition by the reception processing section and a control section that controls an output of the sensor section. The sensor section is an image sensor. The causal analysis section determines the cause of a drop (Continued)

HIGH-RESOLUTION/HIGH-BIT-LENGTH IMAGE

HIGH-RESOLUTION/LOW-BIT-LENGTH IMAGE in characteristic of recognition by the recognition processing section on the basis of low-resolution high-bit-length image data for causal analysis.

20 Claims, 20 Drawing Sheets

(51) Int. Cl.

| | |
|---|---|
| ***G06V 10/12*** | (2022.01) |
| ***G06V 10/82*** | (2022.01) |
| ***G06V 20/56*** | (2022.01) |
| ***H04N 7/18*** | (2006.01) |
| ***H04N 23/60*** | (2023.01) |

(56) References Cited

FOREIGN PATENT DOCUMENTS

| | | | | |
|---|---|---|---|---|
| WO | 2020/036043 A1 | | 2/2020 | |
| WO | 2020/036044 A1 | | 2/2020 | |
| WO | WO-2020045682 A1 | * | 3/2020 | ............. G06V 20/10 |

* cited by examiner

HIGH-RESOLUTION/HIGH-BIT-LENGTH IMAGE

HIGH-RESOLUTION/LOW-BIT-LENGTH IMAGE

LOW-RESOLUTION/HIGH-BIT-LENGTH IMAGE

HIGH-RESOLUTION/LOW-BIT-LENGTH IMAGE

LOW-RESOLUTION/HIGH-BIT-LENGTH IMAGE

INFORMATION PROCESSING APPARATUS, INFORMATION PROCESSING METHOD, AND SENSOR APPARATUS

CROSS REFERENCE TO RELATED APPLICATIONS

This application is a U.S. National Phase of International Patent Application No. PCT/JP2021/044541 filed on Dec. 3, 2021, which claims priority benefit of Japanese Patent Application No. JP 2021-013994 filed in the Japan Patent Office on Jan. 29, 2021. Each of the above-referenced applications is hereby incorporated herein by reference in its entirety.

TECHNICAL FIELD

The technology disclosed in this description (referred to as the present disclosure) relates to an information processing apparatus, an information processing method, a computer program, and a sensor apparatus for analyzing recognition processing that uses machine learning models.

BACKGROUND ART

Given the increasing performance in recent years of imaging apparatuses such as a small camera incorporated in digital still cameras, digital video cameras, and multifunctional mobile phones (smartphones), there has been developed an imaging apparatus having an image recognition function for recognizing a predetermined object included in a captured image. For example, there has been proposed an imaging apparatus that shortens its recognition processing time and consumes less energy by reading pixel signals in readout units set as a portion of the pixel region of the imaging element while causing an internal recognizing section having learned training data in the readout units to perform recognition processing on the pixel signals in the readout units (see PTL 1).

For the recognition processing on images, it is becoming general practice to use machine learning models such as a CNN (Convolutional Neural Network) or an RNN (Recurrent Neural Network) among a DNN (Deep Neural Network).

There have been cases in which recognition performance is insufficient, such as the case of low recognition rates of image recognition processing or the case of low reliability of recognition. Two things are considered to be the cause of the insufficiency: low performance of recognition algorithms, and low performance of sensors. In order to analyze the effects of the recognition algorithm on recognition performance, there has been developed XAI (eXplainable Artificial Intelligence) technology, for example. On the other hand, in the case where the performance of the sensor is the cause of the insufficient recognition performance, it is difficult to determine which of the characteristics of the sensor is the cause of the poor performance.

CITATION LIST

Patent Literature

[PTL 1]
Japanese Patent No. 6635221

SUMMARY

Technical Problem

An object of the present disclosure is to provide an information processing apparatus, an information processing method, a computer program, and a sensor apparatus for analyzing the cause of the result of recognition by use of a machine learning model.

Solution to Problem

The present disclosure has been made in view of the above problem and, according to a first aspect thereof, provides an information processing apparatus including a recognition processing section configured to perform object recognition processing on sensor information from a sensor section by use of a trained machine learning model, a causal analysis section configured to analyze a cause of a result of recognition by the recognition processing section on the basis of the sensor information from the sensor section and the result of recognition by the reception processing section, and a control section configured to control an output of the sensor section.

The information processing apparatus according to the first aspect of the present disclosure further includes a trigger generating section configured to generate a trigger for the control section to control the output of the sensor section. The trigger generating section generates the trigger on the basis of at least one of the result or reliability of recognition by the recognition processing section, the result of causal analysis by the causal analysis section, or external information supplied from an outside of the information processing apparatus.

The control section controls the output of the sensor section on the basis of at least one of the result of recognition by the recognition processing section or a result of analysis by the causal analysis section. In a case where the sensor section is an image sensor, the control section controls a spatial arrangement of an image for analysis by the causal analysis section. The control section controls an adjustment target formed by at least one of multiple characteristics of the sensor section, the adjustment target being for use with a sensor output for analysis by the causal analysis section. On the basis of the result of analysis by the causal analysis section, the control section controls a setup of the sensor section for acquiring the sensor information for ordinary recognition processing by the recognition processing section.

According to a second aspect of the present disclosure, there is provided an information processing method including a recognition processing step of performing object recognition processing on sensor information from a sensor section by use of a trained machine learning model, a causal analysis step of analyzing the cause of a result of recognition by the recognition processing section on the basis of the sensor information from the sensor section and the result of recognition by the reception processing section, and a control step of controlling an output of the sensor section.

According to a third aspect of the present disclosure, there is provided a computer program described in a computer-readable format for causing a computer to function as a recognition processing section configured to perform object recognition processing on sensor information from a sensor section by use of a trained machine learning model, a causal analysis section configured to analyze the cause of a result of recognition by the recognition processing section on the basis of the sensor information from the sensor section and the result of recognition by the reception processing section, and a control section configured to control an output of the sensor section.

The computer program according to the third aspect of the present disclosure is what defines a computer program in a computer-readable format for causing a computer to implement predetermined processing. In other words, installing the computer program according to the third aspect of this disclosure into the computer allows it to exert collaborative effects similar to those provided by the information processing apparatus according to the first aspect of the disclosure.

According to a fourth aspect of the present disclosure, there is provided a sensor apparatus including a sensor section, a recognition processing section configured to perform object recognition processing on sensor information from a sensor section by use of a trained machine learning model, a causal analysis section configured to analyze the cause of a result of recognition by the recognition processing section on the basis of the sensor information from an image sensor and the result of recognition by the reception processing section, and a control section configured to control an output of the image sensor. The sensor section, the recognition processing section, the causal analysis section, and the control section are integrated in a single semiconductor package.

Advantageous Effects of Invention

According to the present disclosure, there can be provided an information processing apparatus, an information processing method, a computer program, and a sensor apparatus for analyzing the cause of the result of recognition by adaptively inputting data for analysis purpose through the use of machine learning models.

It is to be noted that the advantageous effects stated in this description are only examples and not limitative of the present disclosure that may provide other advantages. Also, there may be additional advantageous effects derived from and not covered by this description.

Other objects, features and advantages of the present disclosure will become apparent upon a reading of the ensuing more detailed description of a preferred embodiment of this disclosure with reference to the appended drawings.

BRIEF DESCRIPTION OF DRAWINGS

FIG. 21 is a flowchart indicating the steps of ordinary recognition processing performed by the imaging apparatus 100 in

FIG. 20.

DESCRIPTION OF EMBODIMENT

The present disclosure is described below under the following headings with reference to the accompanying drawings.

- A. Configuration of imaging apparatus
- B. Overview of present disclosure
- C. Causal analysis
  - C-1. Causal analysis from viewpoint of information amount
  - C-2. Causal analysis from viewpoint of recognizer
- D. Variations of sensor output
  - D-1. Spatial arrangements for analysis output
  - D-2. Adjustment target for analysis output
  - D-3. Combinations for analysis output
  - D-4. Control triggers for analysis output
  - D-5. Control timing for analysis output
    - D-5-1. Switching for analysis output at intervals of one frame
    - D-5-2. Switching for analysis output at intervals of less than one frame E. Functional configuration
E-1. Causal analysis
E-2. Generation of control information
E-3. Control triggers
E-4. Operations of imaging apparatus
E-4-1. Operations of ordinary recognition processing
E-4-2. Operations to output data for analysis purpose
E-4-3. Process of analyzing cause of recognition result
E-4-4. Methods of outputting image data for analysis purpose
F. Application fields
G. Application examples

A. Configuration of Imaging Apparatus

Figure 1:
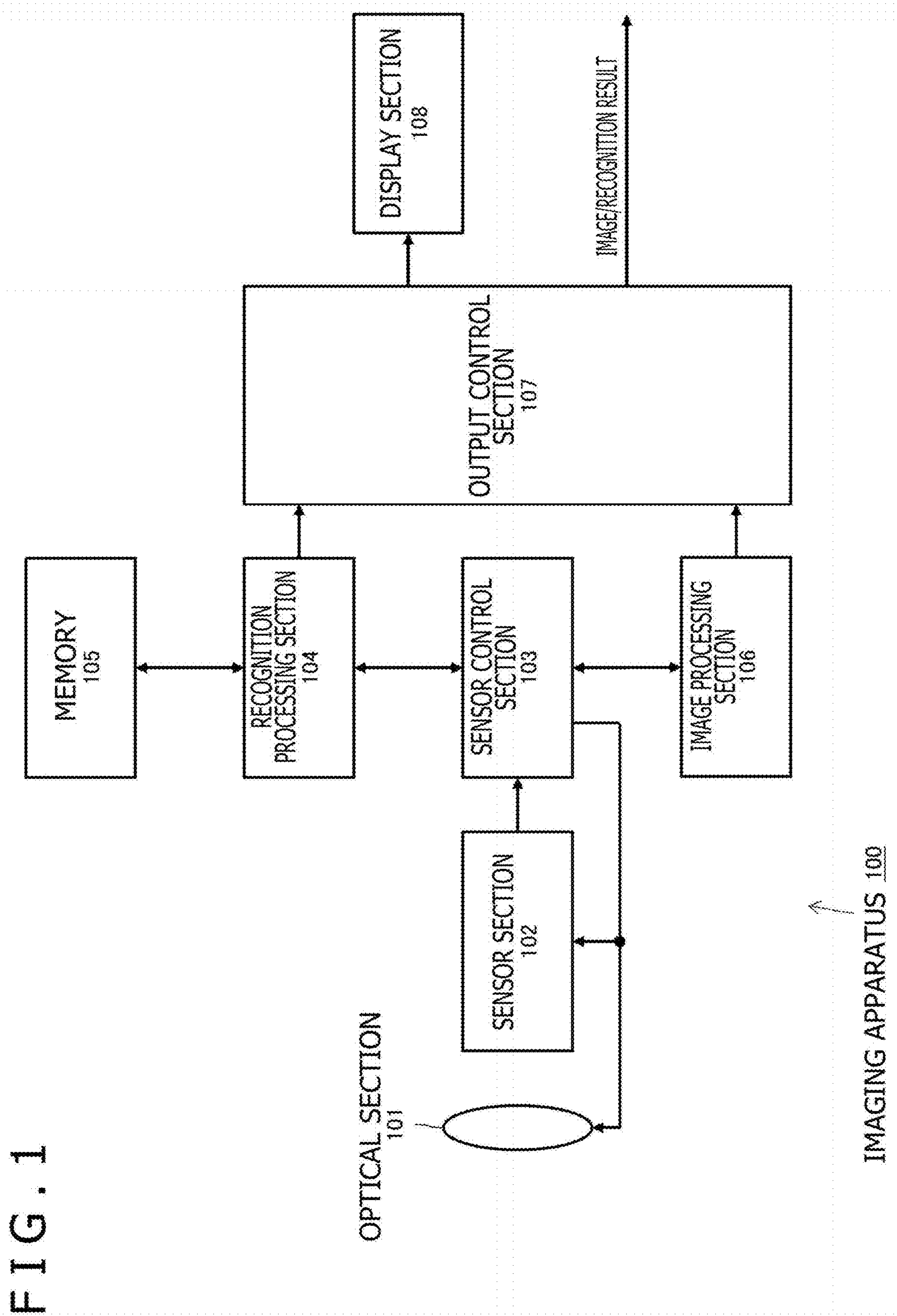
FIG. 1 is a diagram depicting an exemplary functional configuration of an imaging apparatus 100.

FIG. 1 depicts an exemplary functional configuration of an imaging apparatus 100 to which the present disclosure can be applied. The imaging apparatus 100 in FIG. 1 includes an optical section 101, a sensor section 102, a sensor control section 103, a recognition processing section 104, a memory 105, an image processing section 106, an output control section 107, and a display section 108. For example, a CMOS (Complementary Metal Oxide Semiconductor) image sensor can be formed by integrating the sensor section 102, the sensor control section 103, the recognition processing section 104, and the memory 105 through the use of the CMOS. It is to be noted that the imaging apparatus 100 may be an infrared-light sensor capturing images using infrared light or some other type of optical sensor.

The optical section 101 includes, for example, multiple optical lenses for focusing the light from a subject onto a light-receiving surface of the sensor section 102, a diaphragm mechanism for adjusting the aperture for incident light, and a focus mechanism for adjusting the focus of irradiation light on the light-receiving surface. The optical section 101 may further include a shutter mechanism for adjusting a period of time during which light is irradiated onto the light-receiving surface. The diaphragm mechanism, focus mechanism, and shutter mechanism in the optical section are configured to be controlled by the sensor control section 103, for example. It is to be noted that the optical section 101 may be configured either integrally with or separately from the imaging apparatus 100.

The sensor section 102 includes a pixel array having multiple pixels arrayed in a matrix pattern. Each of the pixels includes a photoelectric conversion element, the pixels being arranged in the matrix pattern to constitute the light-receiving surface. The optical section 101 forms an image of incident light on the light-receiving surface, with each pixel of the sensor section 102 outputting a pixel signal corresponding to the irradiation light on the pixel. The sensor section 102 further includes a drive circuit that drives the pixels in the pixel array, and a signal processing circuit that performs predetermined signal processing on a signal read from each of the pixels so as to output the signal as the pixel signal of each pixel. The sensor section 102 outputs the pixel signal of each pixel in the pixel region as image data in digital form.

The sensor control section 103 includes a microprocessor, for example. The sensor control section 103 controls readout of the pixel data from the sensor section 102 and outputs image data based on each pixel signal read from each pixel. The pixel data output from the sensor control section 103 is transferred to the recognition processing section 104 and also to the image processing section 106.

Also, the sensor control section 103 generates an imaging control signal for controlling the sensor characteristics of the sensor section 102 (resolution, line length, frame rate, shutter speed/exposure, etc.), and supplies the generated signal to the sensor section 102. The imaging control signal includes information indicative of the exposure and analog gain at the time of imaging by the sensor section 102. The signal control signal further includes control signals for causing the sensor section 102 to perform imaging operations, such as vertical and horizontal synchronization signals.

On the basis of the pixel data transferred from the sensor control section 103, the recognition processing section 104 performs processes (human detection, facial identification, image categorization, etc.) to recognize objects in the image formed by the pixel data. Preferably, the recognition processing section 104 may perform recognition processing that uses the image data having undergone the image processing by the image processing section 106. The result of recognition by the recognition processing section 104 is transferred to the output control section 107.

In this embodiment, the recognition processing section 104 includes a DSP (Digital Signal Processor), for example. The recognition processing section 104 performs recognition processing using machine learning models. The memory 105 stores model parameters obtained by preliminary model training. The recognition processing section 104 carries out recognition processing using a model set with the model parameters read from the memory 105. The machine learning model is configured specifically with a DNN such as a CNN or an RNN.

Given the pixel data transferred from the sensor control section 103, the image processing section 106 performs processes to obtain an image suitable for visual recognition by humans. By so doing, the image processing section 106 outputs the image data formed, for example, by pixel data in a bundle. For example, in a case where the pixels in the sensor section 102 are each provided with a color filter so that the data of each pixel has R (red), G (green), or B (blue) color information, the image processing section 106 carries out such processes as demosaicing and white balance adjustment. Also, the image processing section 106 can instruct the sensor control section 103 to read the pixel data necessary for image processing from the sensor section 102. The image processing section 106 transfers the image data obtained by processing the pixel data to the output control section 107. For example, the above-described functions of the image processing section 106 are implemented by an ISP (Image Signal Processor) executing programs stored beforehand in a local memory (not depicted).

The output control section 107 includes a microprocessor, for example. The output control section 107 receives the result of recognition of intra-image objects by the recognition processing section 104, and also receives the image data resulting from image processing by the image processing section 106. In so doing, the output control section 107 outputs either or both of the two inputs to the outside of the imaging apparatus 100. Further, the output control section 107 outputs the image data to the display section 108. The user is able to visually recognize the image displayed on the display section 108. The display section 108 may be either incorporated in the imaging apparatus 100 or connected externally thereto.

Figure 2:
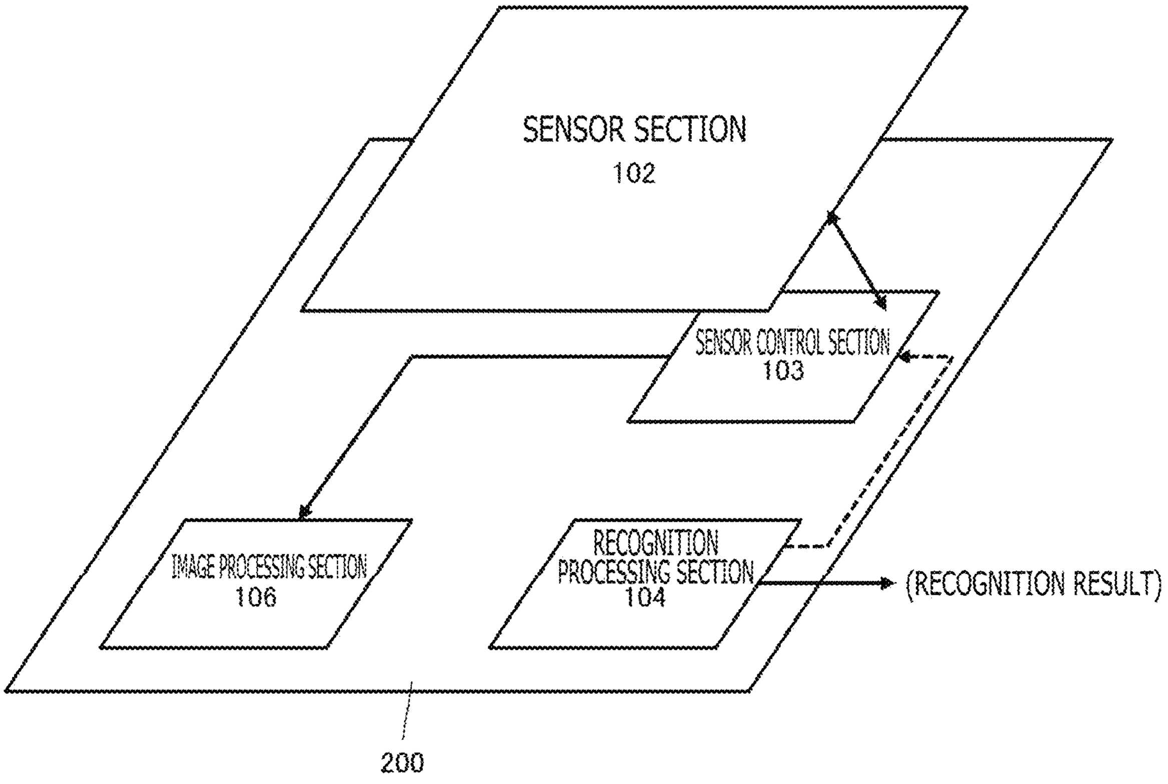
FIG. 2 is a diagram depicting an exemplary hardware implementation of the imaging apparatus 100.

FIG. 2 depicts an exemplary hardware implementation of the imaging apparatus 100. In the example in FIG. 2, the sensor section 102, the sensor control section 103, the recognition processing section 104, the memory 105, the image processing section 106, and the output control section 107 are mounted on a single chip 200. It is to be noted that the memory 105 and the output control section 107 are omitted in FIG. 2 for simplification of the diagram.

In the configuration example in FIG. 2, the result of recognition by the recognition processing section 104 is output to the outside of the chip 200 via the output control section 107. The recognition processing section 104 may acquire, from the sensor control section 103, the pixel data or image data for use in recognition via an interface inside the chip 200.

Figure 3:
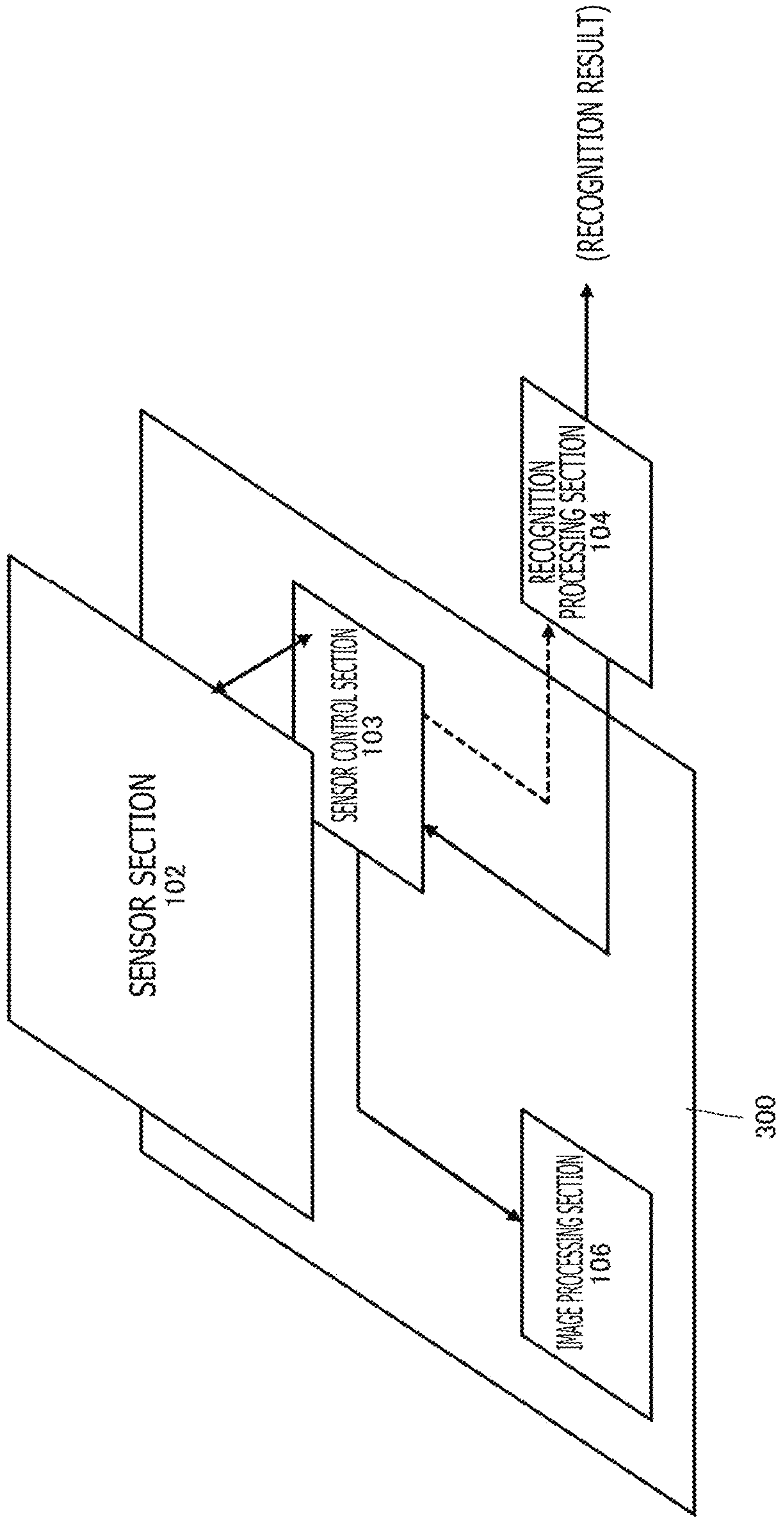
FIG. 3 is a diagram depicting another exemplary hardware implementation of the imaging apparatus 100.

FIG. 3 depicts another exemplary hardware implementation of the imaging apparatus 100. In the example in FIG. 3, the sensor section 102, the sensor control section 103, the image processing section 106, and the output control section 107 are mounted on a single chip 300, with the recognition processing section 104 and the memory 105 arranged outside the chip 300. It is to be noted that the memory 105 and the output control section 107 are also omitted in FIG. 3 for simplification of the diagram.

In the configuration example in FIG. 3, the recognition processing section 104 acquires, from the output control section 107, the pixel data or image data for use in recognition via a chip-to-chip communication interface. Also, the recognition processing section 104 outputs the result of recognition directly to the outside. Obviously, there can also be a configuration such that the result of recognition by the recognition processing section 104 is sent back to the output control section 107 in the chip 300 via the chi-to-chip communication interface, before the output control section 107 outputs the recognition result to the outside of the chip 300.

In the configuration example in FIG. 2, the recognition processing section 104 and the sensor control section 103 are both mounted on the same chip 200, so that communication between the recognition processing section 104 and the sensor control section 103 is performed at high speed via the interface in the chip 200. In the configuration example in FIG. 3, on the other hand, the recognition processing section 104 is arranged outside the chip 300, so that it is easy to replace the recognition processing section 104. However, communication between the recognition processing section 104 and the sensor control section 103 needs to be carried out via the chip-to-chip interface, which reduces communication speed.

Figure 4:
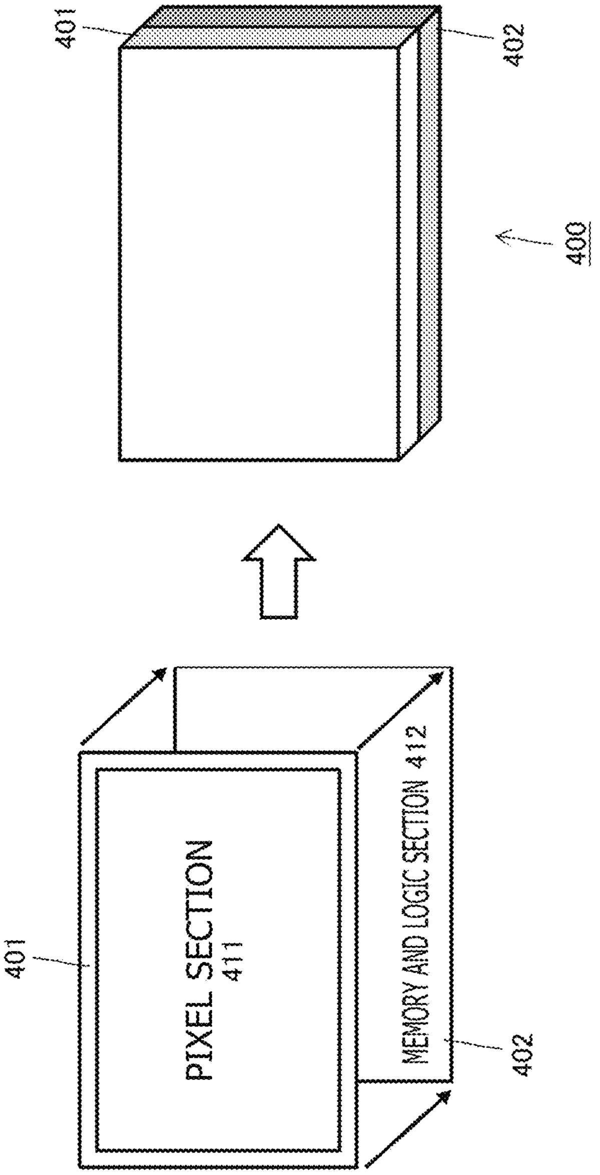
FIG. 4 is a diagram depicting an example of a two-layer stacked image sensor 400.

FIG. 4 depicts how the semiconductor chips 200 (or 300) of the imaging apparatus 100 are stacked in two layers to form a two-layer stacked CMOS image sensor 400. In the structure in FIG. 4, a pixel section 411 is formed on a first-layer semiconductor chip 401, and a memory and logic section 412 is formed on a second-layer second semiconductor chip 402.

The pixel section 411 includes at least the pixel array in the sensor section 102. The memory and logic section 412 includes, for example, the sensor control section 103, the recognition processing section 104, the memory 105, the image processing section 106, the output control section 107, and the interface to permit communication between the imaging apparatus 100 and the outside. The memory and logic section 412 further includes part or all of the drive circuit that drives the pixel array in the sensor section 102. Although not depicted in FIG. 4, the memory and logic section 412 may further include a memory for use by the image processing section 106 in processing image data.

As depicted on the right part in FIG. 4, the semiconductor chip 401 of the first layer and the semiconductor chip 402 of the second layer are brought into electrical contact and bonded together to configure the imaging apparatus 100 as a single solid-state imaging element.

Figure 5:
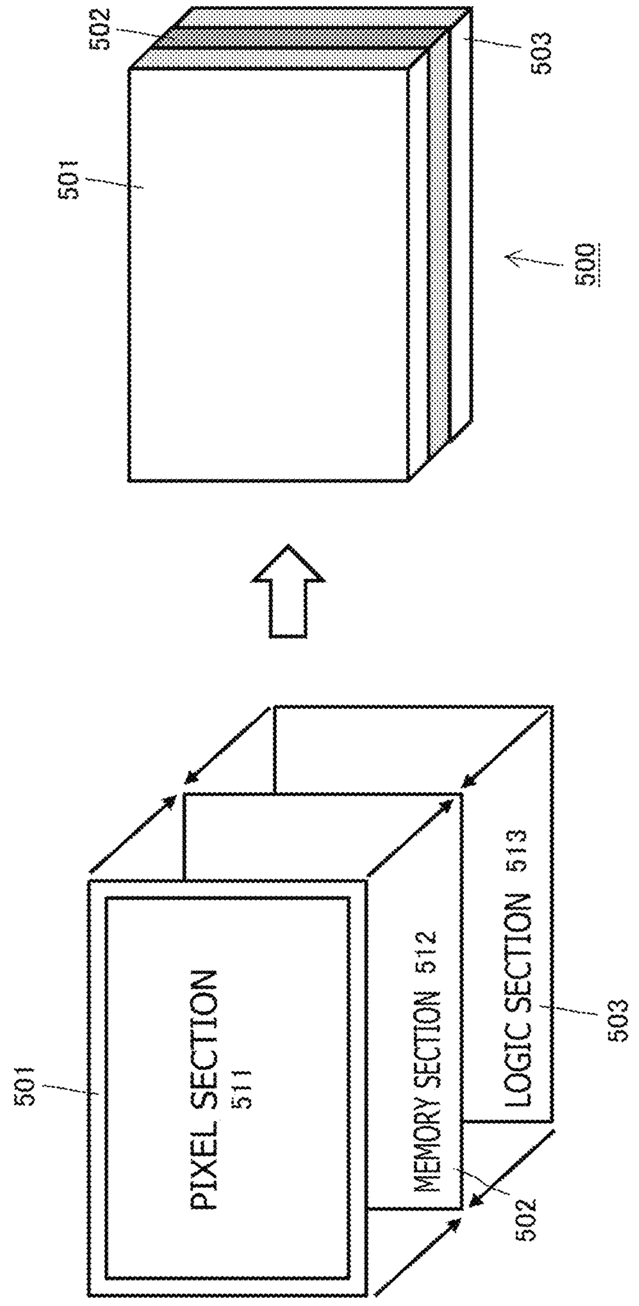
FIG. 5 is a diagram depicting an example of a three-layer stacked image sensor 500.

FIG. 5 depicts how the semiconductor chips 200 (or 300) of the imaging apparatus 100 are stacked in three layers to form a three-layer stacked CMOS image sensor 500. In the structure in FIG. 5, a pixel section 511 is formed on a first-layer semiconductor chip 501, a memory section 512 is formed on a second-layer semiconductor chip 502, and a logic section 513 is formed on a third layer semiconductor chip 503.

The pixel section 511 includes at least the pixel array in the sensor section 102. The logic section 513 includes, for example, the sensor control section 103, the recognition processing section 104, the image processing section 106, the output control section 107, and the interface for permitting communication between the imaging apparatus 100 and the outside. The logic section 513 further includes part or all of the drive circuit that drives the pixel array in the sensor section 102. In addition to the memory 105, the memory section 512 may include a memory for use by the image processing section 106 in processing image data.

As depicted on the right part in FIG. 5, the semiconductor chip 501 of the first layer, the semiconductor chip 502 of the second layer, and the semiconductor chip 503 of the third layer are brought into electrical contact and bonded together to configure the imaging apparatus 100 as a single solid-state imaging element.

Figure 6:
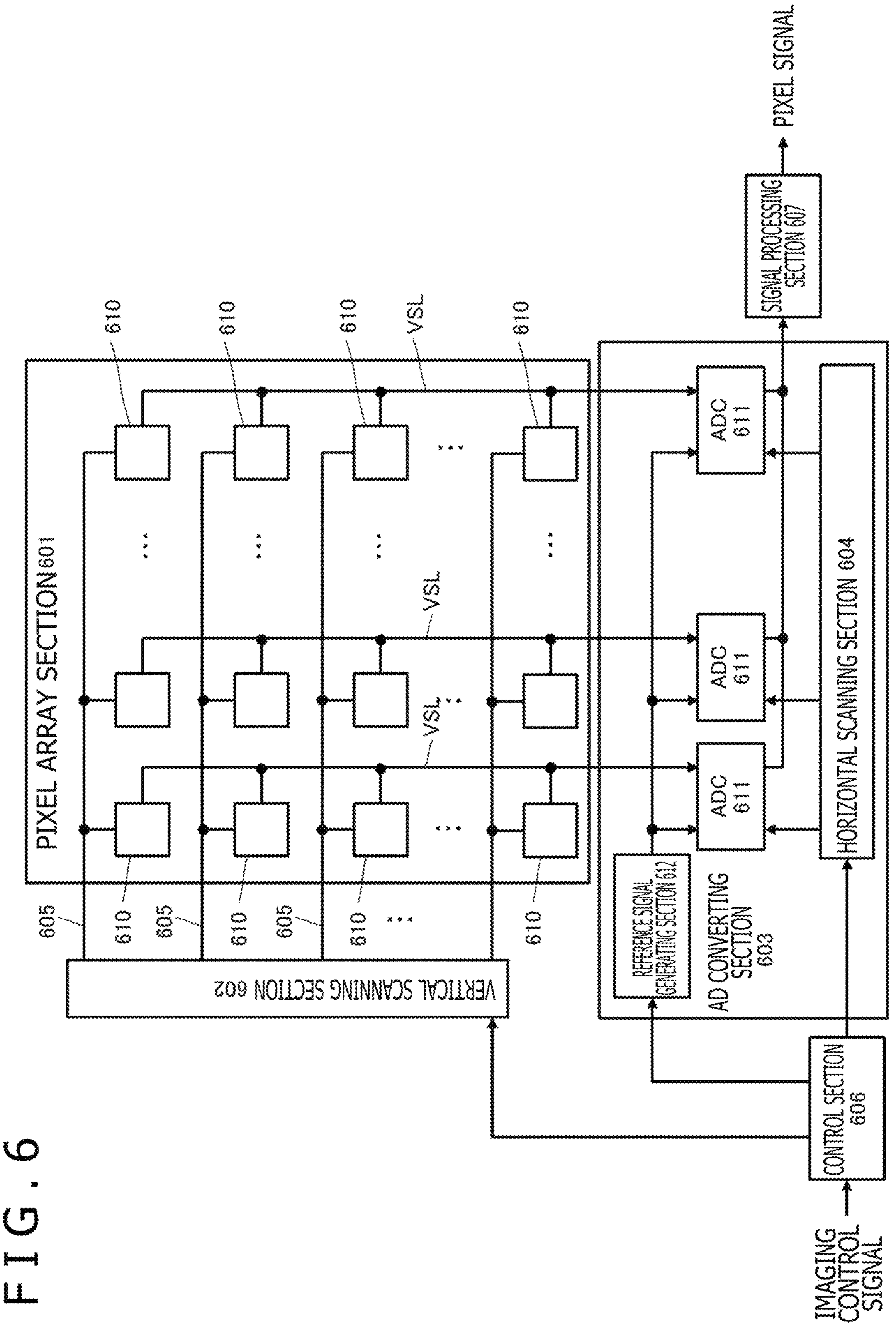
FIG. 6 is a diagram depicting an exemplary configuration of a sensor section 102.

FIG. 6 depicts an exemplary configuration of the sensor section 102. The sensor section 102 in FIG. 6 includes a pixel array section 601, a vertical scanning section 602, an AD (Analog to Digital) converting section 603, a horizontal scanning section 604, pixel signal lines 605, vertical signal lines VSL, a control section 606, and a signal processing section 607. It is to be noted that the control section 606 and the signal processing section 607 in FIG. 6 may be included in the sensor control section 103 in FIG. 1, for example.

The pixel array section 601 includes multiple pixel circuits 610 each including a photoelectric conversion element subjecting received light to photoelectric conversion and a circuit for reading electrical charges from the photoelectric conversion element. The multiple pixel circuits 610 are arranged horizontally (in the row direction) and vertically (in the column direction) in a matrix pattern. The pixel circuits 610 arrayed in the row direction constitute lines. For example, in a case where a single-frame image is formed with 1,920 pixels by 1,080 lines, the pixel array section 601 forms a single-frame image using the pixel signals of 1,080 lines each constituted by 1,920 pixel circuits 610.

In the pixel array section 601, each row of the pixel circuits 610 is connected with a pixel signal line 605, and each column of the pixel circuits 610 is connected with a vertical signal line VSL. Those ends of the pixel signal lines 605 not connected with the pixel array section 601 are connected to the vertical scanning section 602. Under control of the control section 606, the vertical scanning section 602 transmits control signals such as drive pulses for reading the pixel signals from the pixels to the pixel array section 601 via the pixel signal lines 605. Those ends of the vertical signal lines VSL not connected with the pixel array section 601 are connected to the AD converting section 603. The pixel signals read from the pixels are transmitted to the AD converting section 603 via the vertical scanning lines VSL.

The pixels signals are read from the pixel circuits 610 by transferring to a floating diffusion (FD) layer the electrical charges accumulated in the photoelectric conversion elements under exposure, the floating diffusion layer converting the transferred electrical charges to voltages. The voltages converted from the electrical charges in the floating diffusion layer are output onto the vertical signal lines VSL via amplifiers.

The AD converting section 603 includes an AD converter 611 provided for each vertical signal line VSL, a reference signal generating section 612, and a horizontal scanning section 604. The AD converter 611 is a column AD converter that performs AD conversion processing on each column of the pixel array section 601. The AD converter 611 carries out AD conversion processing on the pixel signal supplied from the pixel circuits 610 so as to generate two digital values for correlated double sampling (CDS) processing for noise reduction, the two digital values being output to the signal processing section 607.

In accordance with the control signals from the control section 606, the reference signal generating section 612 generates, as a reference signal, a ramp signal used by each column AD converter 611 to convert the pixel signal into two digital values, the ramp signal being supplied as the reference signal to each column AD converter 611. The ramp signal is a signal of which the voltage level drops at a constant gradient or in steps over time.

When supplied with the ramp signal, the AD converter 611 causes an internal counter to start counting in keeping with a clock signal. At the time the voltage of the ramp signal exceeds the voltage of the pixel signal supplied from the vertical signal line VSL upon comparison therebetween, the AD converter 611 causes the counter to stop counting and outputs a value representing the count value at that point in time, thereby converting the pixel signal in analog form into the digital values.

The signal processing section 607 performs CDS processing on the two digital values generated by the AD converter 611 to generate a pixel signal in digital form (pixel data) for output to the outside of the sensor control section 103.

Under control of the control section 606, the horizontal scanning section 604 performs selecting operations to select the AD converters 611 in a predetermined order to let the AD converters 611 output their temporarily-held digital values successively to the signal processing section 607. The horizontal scanning section 604 is configured using shift registers or address decoders, for example.

On the basis of the imaging control signal fed from the sensor control section 103, the control section 606 generates drive signals for driving the vertical scanning section 602, the AD converting section 603, the reference signal generating section 612, and the horizontal scanning section 604, and outputs the generated drive signals to the respective sections. For example, in accordance with the vertical and horizontal synchronization signals included in the imaging control signal, the control section 606 generates control signals to be supplied to each pixel circuit 610 by the vertical scanning section 602 via the pixel signal lines 605, and feeds the generated control signals to the vertical scanning section 602. Also, the control section 606 transfers, to the AD converting section 603, information indicative of analog gains included in the imaging control signal. On the basis of the information indicative of the analog gains, the AD converting section 603 internally controls the gain of the pixel signal input to each AD converter 611 via the vertical signal line VSL.

On the basis of the control signal fed from the control section 606, the vertical scanning section 602 supplies each pixel circuit 610 per line with various signals including drive pulses over the pixel signal line 605 of the selected pixel row in the pixel array section 601, each pixel circuit 610 in turn outputting the pixel signal onto the vertical signal line VSL. The vertical scanning section 602 is configured using shift registers or address decoders, for example. Also, the vertical scanning section 602 controls the exposure of each pixel circuit 610 on the basis of information indicative of exposure supplied from the control section 606.

The sensor section 102 configured as depicted in FIG. 6 is a column AD type image sensor in which one AD converter 611 is arranged for each column.

There are two types of methods including, for imaging by the pixel array section 601, a rolling shutter method and a global shutter method. The global shutter method involves causing all pixels of the pixel array section 601 to be simultaneously exposed so as to read the pixel signals in a batch. The rolling shutter method, on the other hand, involves causing the pixels of the pixel array section 601 to be exposed successively from top to bottom, line by line, to read the pixel signals therefrom.

B. Overview of Present Disclosure

For the imaging apparatus 100 providing the recognizer functions depicted in FIG. 1, there are cases in which the recognition performance of the recognition processing section 104 as output via the output control section 107 is not sufficient (e.g., low recognition rate or low recognition reliability). Two things, low performance of the recognition algorithm and low performance of the sensor, are considered to be the cause of the insufficient performance. In a case where sufficient recognition performance is not achieved due to the low performance of the sensor, it is difficult to determine which of the characteristics of the sensor is specifically the cause of the poor performance.

The performance of the sensor includes resolution, bit length (gradation of each pixel), frame rate, and dynamic range. Given a captured image, it is difficult to determine whether the sensor performance is responsible for not being able to improve the recognition performance, or to determine which of the above-mentioned characteristics of the sensor performance is the cause of the insufficiency.

If the sensor information necessary for the recognition processing section 104 to achieve sufficient recognition performance (i.e., high-resolution, high-bit-length, high-bit-rate, high-dynamic-range image data) can be obtained, there is no drop in recognition performance that would be attributable to the performance of the sensor section 102. The sensor information may include not only image-related information but also meta information regarding high resolution, bit rate, dynamic range, shutter speed, and analog gains. However, due to hardware constraints on the sensor section 102, it is unrealistic to acquire the sensor information that would include such meta information. Specifically, it is difficult for the sensor section 102 to capture a high-resolution, high-bit-length image. It is only possible to obtain either a high-resolution low-bit-length image, which offers a reduced bit length, or a low-resolution high-bit-length image, which has a reduced resolution.

Whereas a high-resolution high-bit-length image is to be used to analyze the cause of the drop in recognition performance of the recognition processing section 104, the present disclosure proposes performing recognition processing that uses the high-resolution low-bit-length image at the time of conducting ordinary recognition processing, and carrying out analytical processing that uses the low-resolution high-bit-length image in order to analyze the cause of the drop in recognition performance more strictly or in more detail.

In other words, the imaging apparatus 100 to which the present disclosure is applied provides two image output modes including one in which the high-resolution low-bit-length image is output at the time of ordinary recognition processing (including at the time of ordinary image output), and the other in which the low-resolution high-bit-length image is output at the time of causal analysis.

The following two events can serve as a trigger to switch the image output mode.

(1) Given a high-resolution low-bit-length image output at the time of ordinary recognition processing, an analysis is performed to determine whether or not gradations are sufficient in the recognition processing, with the gradations being determined to be insufficient.

(2) Given a high-resolution low-bit-length image output at the time of ordinary recognition processing, either recognition is absent or the reliability of recognition is low.

In a case where the trigger (1) or (2) above occurs, the image output mode of the sensor section 102 is switched from ordinary recognition (high resolution and low bit length) to causal analysis (low resolution and high bit length). The low-resolution high-bit-length image is then used to determine whether or not the performance of the sensor section 102 is the cause of the absence or low reliability of recognition, and to determine which of the characteristics of the sensor section 102 is the cause.

The present disclosure thus makes it possible to determine which of the characteristics of the sensor section 102 (resolution, bit length, etc.) is the cause of the absence or low reliability of recognition of objects in the image data acquired from the sensor section 102. It is also possible, on the basis of the result of such analysis, to dynamically change a setup of the sensor section 102 so as to improve recognition performance.

C. Causal Analysis

Figure 7A:
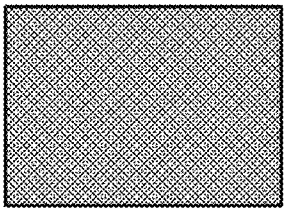
FIGS. 7A, 7B, and 7C include views for explaining a scheme for switching image output modes.
Figure 7B:
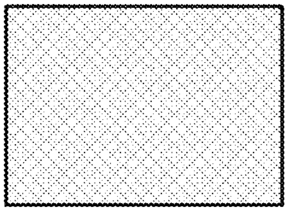
Figure 7C:

FIGS. 7A, 7B, and 7C depict a scheme for switching the image output mode of the imaging apparatus 100.

View in FIG. 7A indicates a high-resolution high-bit-length image. Using this high-resolution high-bit-length image would make it possible simultaneously to perform ordinary recognition processing with the recognition processing section 104 and to conduct analytical processing to determine the cause of the absence or low reliability of recognition. However, due to hardware constraints on the sensor section 102, it is difficult to output the high-resolution high-bit-length image.

In contrast, View in FIG. 7B depicts a high-resolution low-bit-length image and View in FIG. 7C gives a low-resolution high-bit-length image. The sensor section 102 is capable of outputting both the high-resolution low-bit-length image and the low-resolution high-bit-length image free of hardware constraints. However, although the high-resolution low-bit-length image in View in FIG. 7B can be used for ordinary recognition processing, insufficient gradations of the image make it difficult to determine the cause of the absence or low reliability of recognition. Whereas the low-resolution high-bit-length image in View in FIG. 7C, with its sufficient gradations, permits determination of the cause of the absence or low reliability of recognition, an insufficient resolution of the image (i.e., small image size) makes it difficult to carry out ordinary recognition processing.

It is proposed here to compare the low-bit-length image in View in FIG. 7B with the high-bit-length image in View in FIG. 7C. With the low-bit-length image having a smaller amount of information per pixel than the high-bit-length image, there is a significant difference therebetween. As a result, whereas an object with a small number of gradations disappears in the low-bit-length image, that object becomes visible in the high-bit-length image with a large number of gradations.

Figure 8:
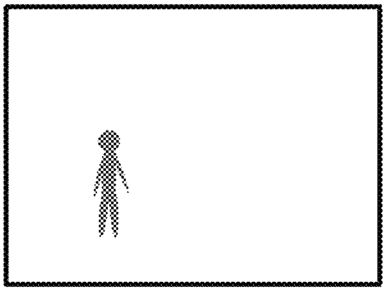
FIG. 8 is a diagram depicting an exemplary high-resolution low-bit-length image.
Figure 9:
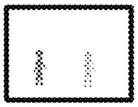
FIG. 9 is a diagram depicting an exemplary low-resolution high-bit-length image.

FIGS. 8 and 9 depict respectively a high-resolution low-bit-length image and a low-resolution high-bit-length image both capturing the same object. Here, the high-resolution low-bit-length image is a HD (HZigh Definition) resolution two-bit (4-gradation) image with 1,280 by 720 pixels (720 p), for example. The low-resolution high-bit-length image is a QQVGA (Quarter Quaeter Video Graphic Array) resolution eight-bit (256-gradation) image with 160 by 120 pixels, for example.

FIGS. 8 and 9 are both images capturing two pedestrians. It is assumed here that the pedestrian on the left is captured with high signal values while the pedestrian on the right is captured only with low signal values. In reference first to FIG. 8, the pedestrian on the left is visibly observable, while the pedestrian on the right with the limited gradations has become indistinguishable and cannot be observed. In reference to FIG. 9, two objects can be observed to exist in the image although the low resolution makes it difficult to determine whether or not they are pedestrians.

In short, the high-bit-length image has a large amount of information per pixel. Consequently, although in a case where objects cannot be recognized or can be recognized only with low reliability in the low-bit-length image, it may still be possible to recognize the objects in the high-bit-length image.

C-1. Causal Analysis from Viewpoint of Information Amount

Figure 10:
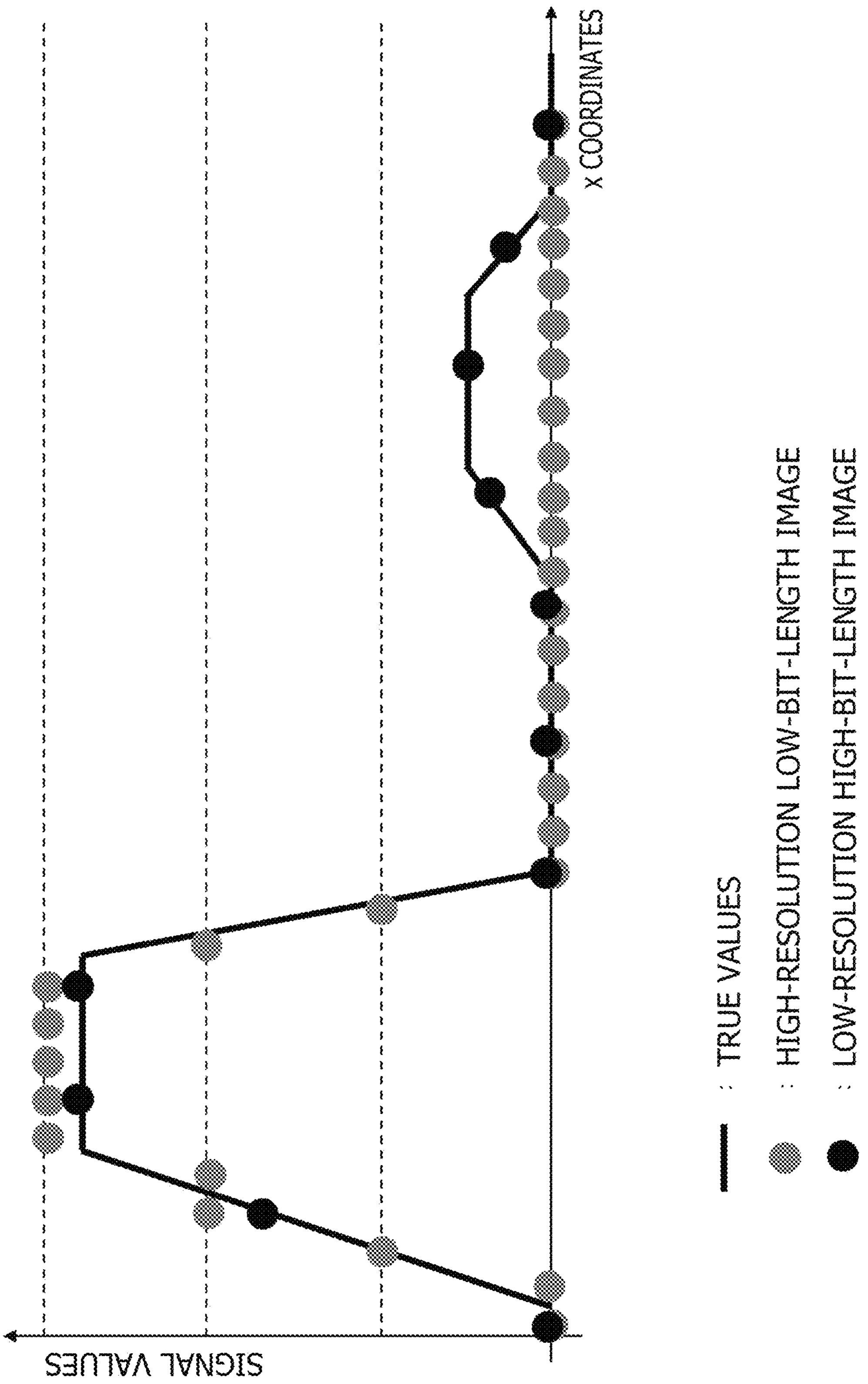
FIG. 10 is a diagram plotting the signal values of pixels in a high-resolution low-bit-length image and a low-resolution high-bit-length image, the pixels being on corresponding horizontal scanning lines.

FIG. 10 plots the signal values of the pixels in the high-resolution low-bit-length image in FIG. 8 and the signal values of the pixels in the low-resolution high-bit-length image in FIG. 9, the pixels being on corresponding horizontal scanning lines. It is to be noted that the horizontal axis denotes x coordinates of an image frame and the vertical axis represents signal values. FIG. 10 indicates the signal values of the pixels on the horizontal scanning lines traversing two objects (i.e., two pedestrians).

The signal values of the pixels in the high-resolution low-bit-length image are plotted with gray dots. The signal values of the pixels in the low-resolution high-bit-length image are plotted with black dots. In FIG. 10, the true values of the signal values on the corresponding horizontal scanning lines are indicated by solid lines. The high-resolution low-bit-length image is densely plotted in the horizontal axis direction because of the high resolution but is discretely plotted in the vertical axis direction due to the low gradations. On the other hand, the low-resolution high-bit-length image is plotted discretely in the horizontal axis direction because of the low resolution but at short intervals due to the high gradations.

Figure 11:
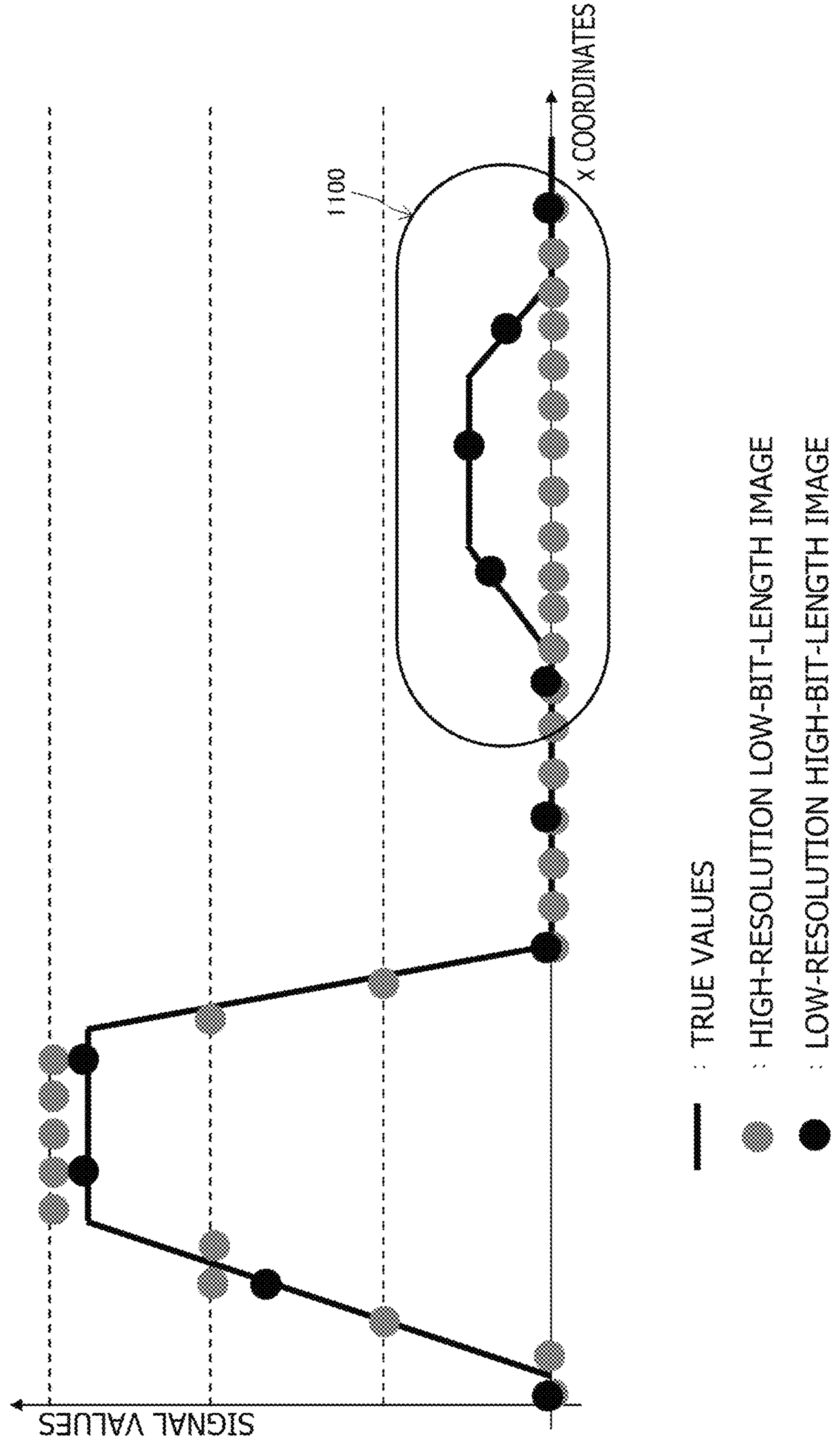
FIG. 11 is another diagram plotting the signal values of pixels in a high-resolution low-bit-length image and a low-resolution high-bit-length image, the pixels being on corresponding horizontal scanning lines.

With reference to the true values plotted by solid lines in FIG. 10, a high ridge on the left and a low ridge on the right are observed. These ridges correspond to the two objects (two pedestrians) included in the images. In FIG. 11, the portion enclosed by a frame indicated by reference number 1100 points to the range in which the object (pedestrian) on the right is present. In the frame 1100, the signal values of the pixels in the high-resolution low-bit-length image are truncated so that the signal level is 0, with no object observed. In a case of the low-resolution high-bit-length image, on the other hand, the signal values of the pixels are plotted approximately on the same signal level as the true values. It can thus be seen that the object on the right (pedestrian) is also observed in the low-resolution high-bit-length image.

Figure 12:
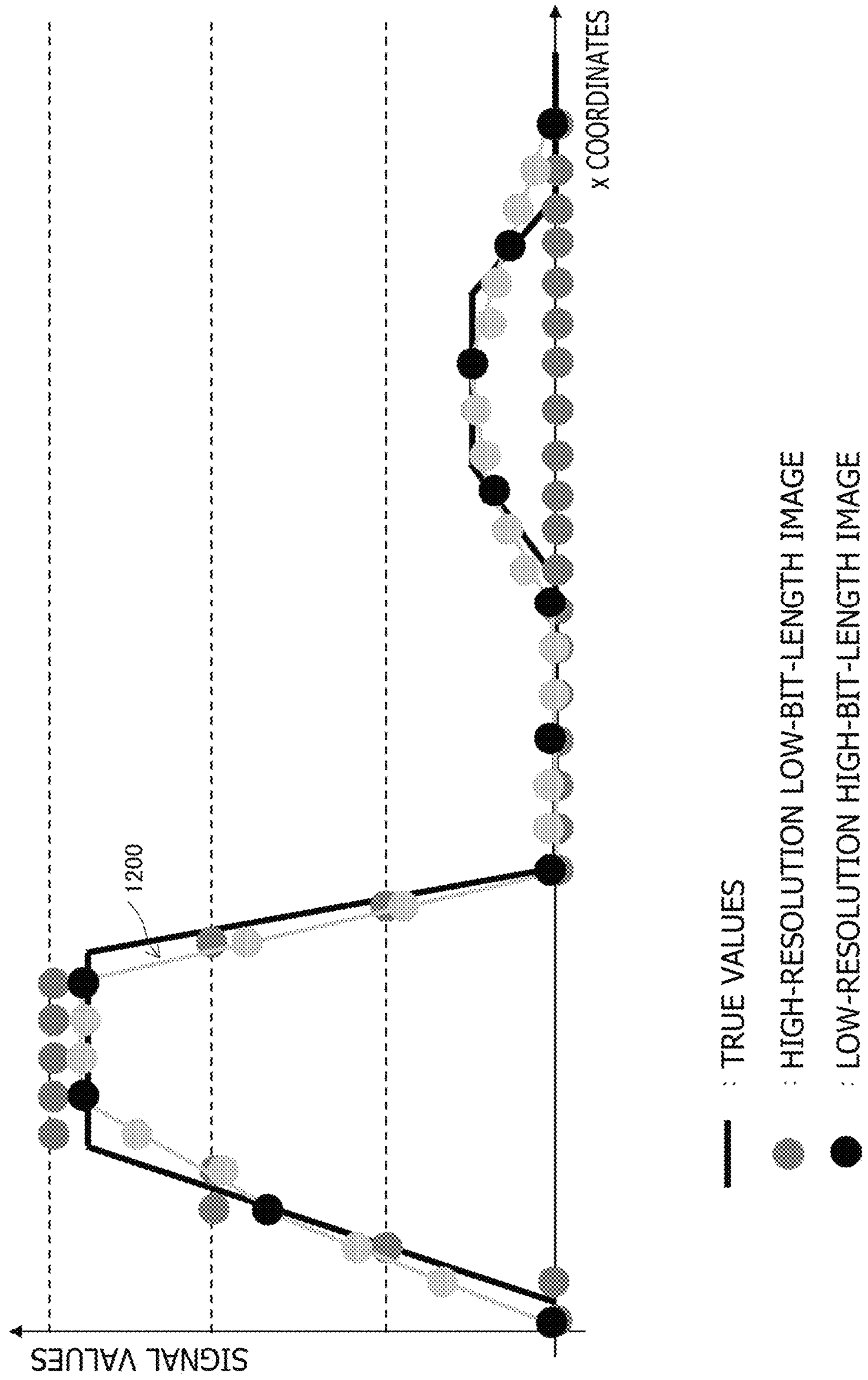
FIG. 12 is a diagram plotting the result of linearly interpolating the signal values of the low-bit-length image.

As depicted in FIG. 10, the high-resolution low-bit-length image is discretely plotted in the vertical axis direction because of the low bit length. In FIG. 12, the gradations of the high-resolution low-bit-length image are linearly interpolated as indicated by reference number 1200. When the difference between the linear interpolation of the low-bit-length image and the gradations of the high-bit-length image is calculated, it is possible to determine whether or not there exists any information that remained invisible in the low-bit-length image.

Thus, in a case where the high-resolution low-bit-length image such as the one in FIG. 8 is used for ordinary recognition processing and the low-resolution high-bit-length image such as the one in FIG. 9 is utilized for causal analysis, the difference in information amount between the two images with respect to gradation is employed in analyzing the cause of the inability to recognize any object in the image for ordinary recognition processing.

C-2. Causal Analysis from Viewpoint of Recognizer

FIGS. 8 and 9 depict respectively an exemplary high-resolution low-bit-length image and an exemplary low-resolution high-bit-length image both capturing the same objects. In a case of performing recognition processing on these images, the recognition processing section 104 can obtain a recognition result indicating the presence of one pedestrian in the high-resolution low-bit-length image in FIG. 8 and the presence of two objects (not recognized as pedestrians) in the low-resolution high-bit-length image in FIG. 9.

As described above, in a case where the high-resolution low-bit-length image such as the one in FIG. 8 is used for ordinary recognition processing and the low-resolution high-bit-length image such as the one in FIG. 9 is utilized for causal analysis and where there is an inconsistency of the recognition results between the two images, it is possible to determine through analysis that there exists information remaining invisible in the low-bit-length image, i.e., that the insufficient gradations are the cause of the inability to recognize objects.

It is proposed here to compare the causal analysis from the viewpoint of information amount as explained in the preceding paragraph C-1 with the causal analysis from the viewpoint of the recognizer as discussed in the current paragraph C-2. The causal analysis from the viewpoint of information amount is liable to be affected by noise, whereas the causal analysis from the viewpoint of the recognizer has an advantage of resisting the effects of noise. However, the causal analysis from the viewpoint of the recognizer requires performing recognition processing on both the image for ordinary recognition processing and the image for causal analysis, which raises the problem of an increased amount of calculation.

D. Variations of sensor output FIGS. 7A, 7B, and 7C depict an example in which the sensor section 102 outputs the high-resolution low-bit-length image for ordinary recognition processing and the low-resolution high-bit-length image for causal analysis. However, this is not limitative of how images are output for causal analysis. The present paragraph D explains variations of sensor output for causal analysis.

D-1. Spatial arrangements for analysis output In the example in FIGS. 7A, 7B, and 7C, the sensor section 102 outputs the image for ordinary recognition processing and the image for causal analysis on a time-division basis. This, however, is not limitative of the method for outputting the images for causal analysis. For example, the image for causal analysis may be spatially arranged inside the image for ordinary recognition processing. In such a case, both ordinary recognition processing and analytical processing on the recognition result can be carried out at the same time.

Figure 13:
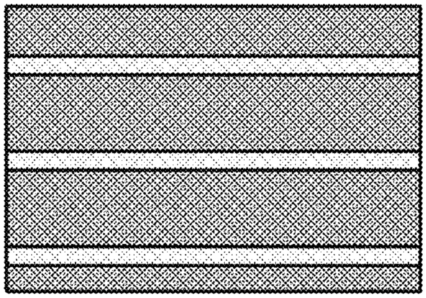
FIG. 13 is a diagram depicting an exemplary spatial arrangement for analysis output.
Figure 14:
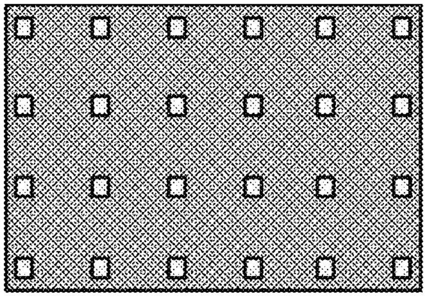
FIG. 14 is a diagram depicting another exemplary spatial arrangement for analysis output.

FIG. 13 depicts an example in which the image for analysis purpose is arranged in units of lines on the image for ordinary recognition processing. FIG. 14 illustrates an example in which small rectangular image blocks for analysis purpose are arranged in a grid pattern on the image for ordinary recognition processing. When the image for analysis purpose is arranged evenly in units of lines or in a grid pattern, it is possible efficiently to detect those locations in the image frame that constitute the cause of the drop in recognition performance (i.e., absence or low reliability of recognition).

Figure 15:
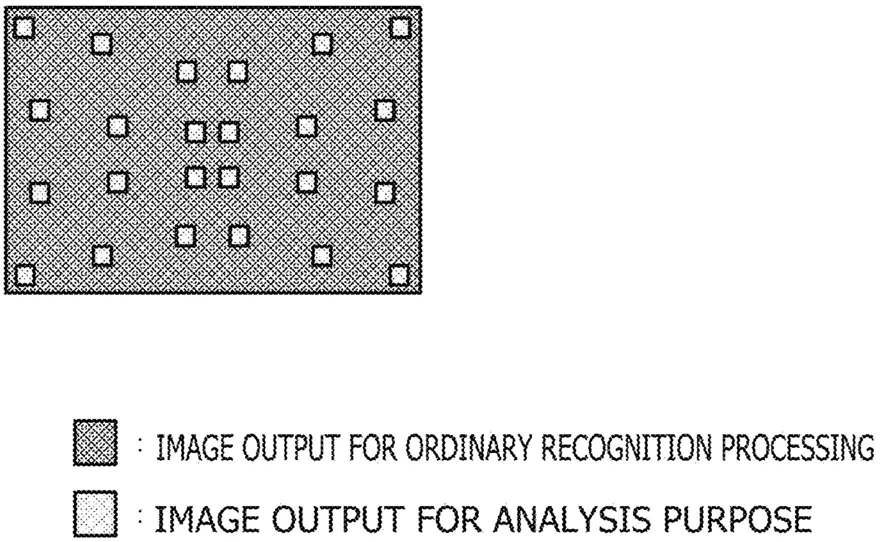
FIG. 15 is a diagram depicting still another exemplary spatial arrangement for analysis output.

FIG. 15 depicts an example in which small rectangular image blocks for analysis purpose are arranged in a desired pattern on the image for ordinary recognition processing. For example, when the recognition result is used to arrange the image blocks for analysis purpose in a pattern reflecting the size and shape of a recognized object, it is possible to focus on analyzing that object. Although not depicted, there may be conceived a method of randomly arranging the image blocks for analysis purpose on the image for ordinary recognition processing.

Figure 16:
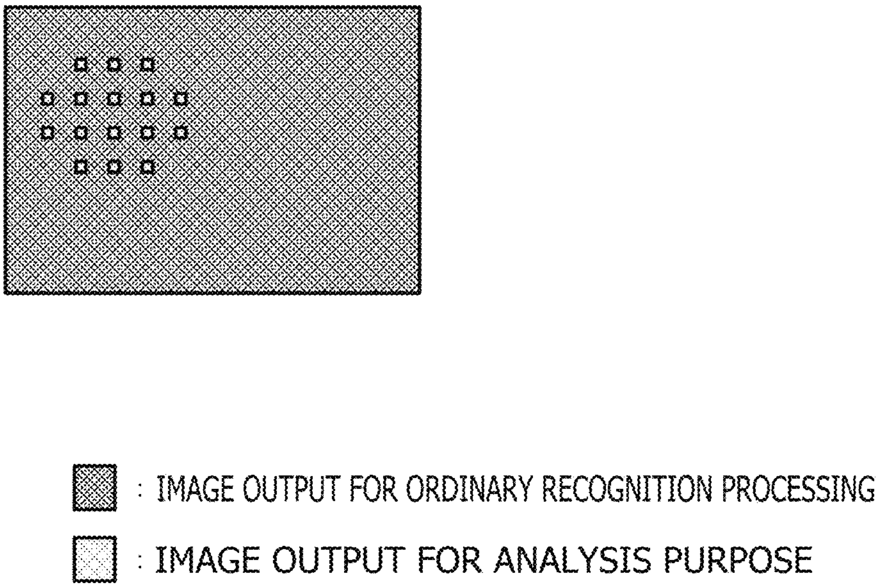
FIG. 16 is a diagram depicting yet another exemplary spatial arrangement for analysis output.

FIG. 16 depicts an example in which a pattern formed by an aggregate of small image blocks for analysis purpose is dynamically generated on the image for ordinary recognition processing. For example, when the recognition result is used to dynamically generate such a pattern for analysis purpose around a recognized object, it is possible to focus on analyzing that recognized object.

D-2. Adjustment Target for Analysis Output

The foregoing description has discussed examples in which, of the images captured by the sensor section 102, the image for ordinary recognition processing and the image for analysis purpose are each acquired with resolution and bit length used primarily as the target for adjustment. That is, these are examples in which the high-resolution low-bit-length image is used for ordinary recognition processing and the low-resolution high-bit-length image is utilized for analysis purpose. However, these are merely examples, and it is also possible to acquire the image output for analysis purpose using various characteristics of the sensor section 102 as the adjustment target.

Basically, the characteristics of the sensor section 102 enumerated from (1) through (4) below may be used as the adjustment target in obtaining the image output for analysis purpose. Obviously, other characteristics than those of the sensor section 102 indicated below may be used instead as the adjustment target for analysis output.

(1) Resolution
(2) Bit length
(3) Frame rate
(4) Shutter speed/exposure

D-3. Combinations for Analysis Output

For example, as depicted in FIGS. 13 through 16, onto an image region for analysis arranged spatially on the image for ordinary recognition processing, the image for analysis purpose is output with one or a combination of at least two of the characteristics (1) through (4) above used as the adjustment target. Resolution and bit length may be combined as the adjustment target for analysis output as described above. Alternatively, at least two other characteristics may be combined as the adjustment target for analysis output.

Figure 17:
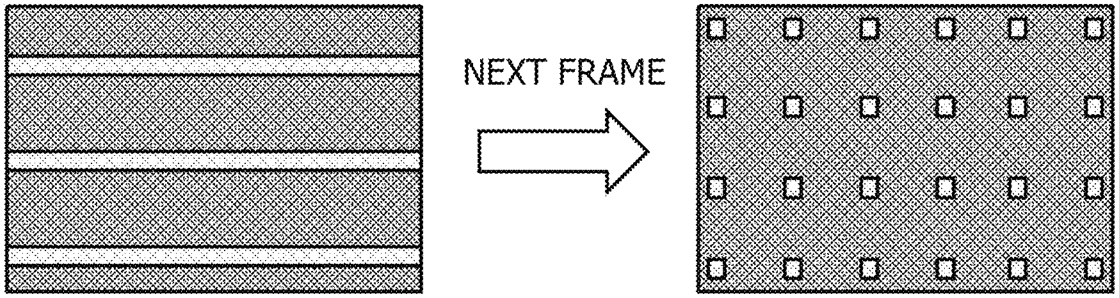
FIG. 17 is a diagram depicting an example of switching spatial arrangements for analysis output.

The foregoing paragraph D-1 described multiple examples each regarding the spatial arrangement for analysis output. Alternatively, multiple spatial arrangements may be combined, with the arrangement switched from one frame to another. FIG. 17 depicts an example in which a spatial arrangement of the image for analysis purpose in units of lines in one frame is switched to another spatial arrangement of image blocks for analysis purpose in a grid pattern in the next frame.

Figure 18:
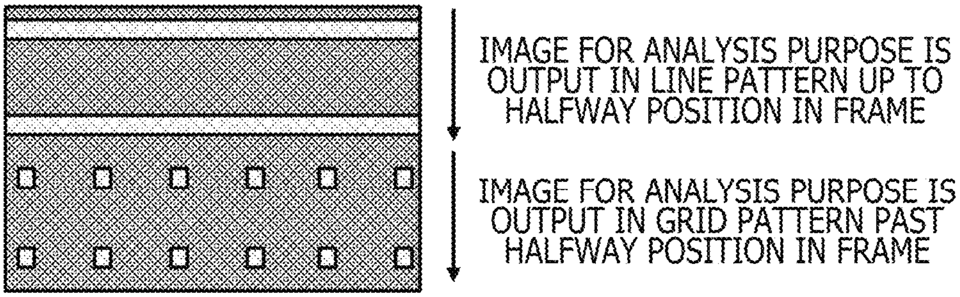
FIG. 18 is a diagram depicting still another example of switching spatial arrangements for analysis output.
Figure 19:
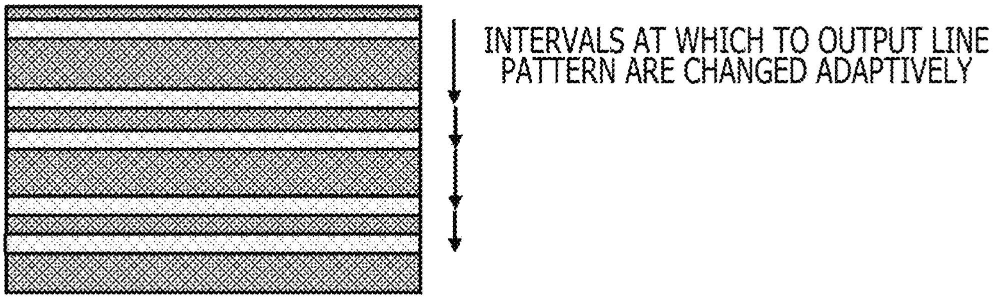
FIG. 19 is a diagram depicting yet another example of switching spatial arrangements for analysis output.

As another alternative, multiple spatial arrangements may be combined and switched within one frame. FIG. 18 depicts an example in which a spatial arrangement of the image for analysis purpose in units of lines up to a halfway position in a frame is switched to another spatial arrangement of image blocks for analysis purpose in a grid pattern past the halfway position in the same frame. FIG. 19 indicates a spatial arrangement example in which the image for analysis purpose is arranged in units of lines with the line-to-line spacing changed adaptively. As an application, control may be returned to one of the preceding lines to readjust the adjustment target in outputting the image for analysis purpose.

In each of the spatial arrangement examples in FIGS. 13 through 19, pieces of the image for analysis purpose such as lines or blocks are discretely arranged. A different adjustment target for analysis output may be allocated in units of lines or blocks. For example, resolution and bit length in combination as the adjustment target up to a given line in a frame may be switched to frame rate as the new adjustment target from the next line onward in the same frame.

As another alternative, the adjustment target for the image for analysis purpose may be switched from one frame to another.

D-4. Control Triggers for Analysis Output

For example, one of the items (1) through (3) below may be used as a trigger to control the output of the image for analysis purpose.

(1) Recognition result or recognition reliability
(2) Causal analysis result
(3) External information Specifically, when the recognition processing section 104 cannot recognize the object supposed to exist in an input image or when the reliability of recognition of an object is low, the absence or low reliability of object recognition is used as a trigger to output the image for analyzing the problem. Also, when a causal analysis section 2003 outputs an analysis result indicating that the performance of the sensor section 102 is the cause of the drop in recognition reliability, the output of the analysis result is used as a trigger to output the image for analysis purpose. Further, the external information serving as a trigger to output the image for analysis purpose includes the surrounding environment of the imaging apparatus 100 (e.g., information regarding the surroundings of the vehicle carrying the imaging apparatus 100) and the input by the user of the instruction for causal analysis.

In response to one of the above-described triggers taking place, one of the following controls (1) through (4) is executed, for example:

(1) In response to the trigger, the output of the image for analysis purpose is started or stopped.
(2) In response to the trigger, the spatial arrangement of the image for analysis purpose is changed.
(3) In response to the trigger, the adjustment target for the image for analysis purpose is changed.
(4) In response to the trigger, the combination of the images for analysis purpose is changed.

D-5. Control Timing for Analysis Output

As discussed above in the foregoing paragraph D-3, the analysis output may be switched at intervals of one frame or less than one frame.

D-5-1. Switching for Analysis Output at Intervals of One Frame

As depicted in FIG. 17, the spatial arrangement for analysis output may be switched from one frame to another. Also, with the spatial arrangement for analysis output kept unchanged, the adjustment target may be switched from one frame to another. Further, the spatial arrangement for analysis output and the combination of the adjustment targets may be switched from one frame to another.

D-5-2. Switching for Analysis Output at Intervals of Less than One Frame

As depicted in FIGS. 18 and 19, the spatial arrangement for analysis output may be switched within one frame. Also, with the spatial arrangement for analysis output kept unchanged, the adjustment target may be switched within one frame. Further, the spatial arrangement for analysis output and the combination of the adjustment targets may be switched from one frame to another.

E. Functional Configuration

Figure 20:
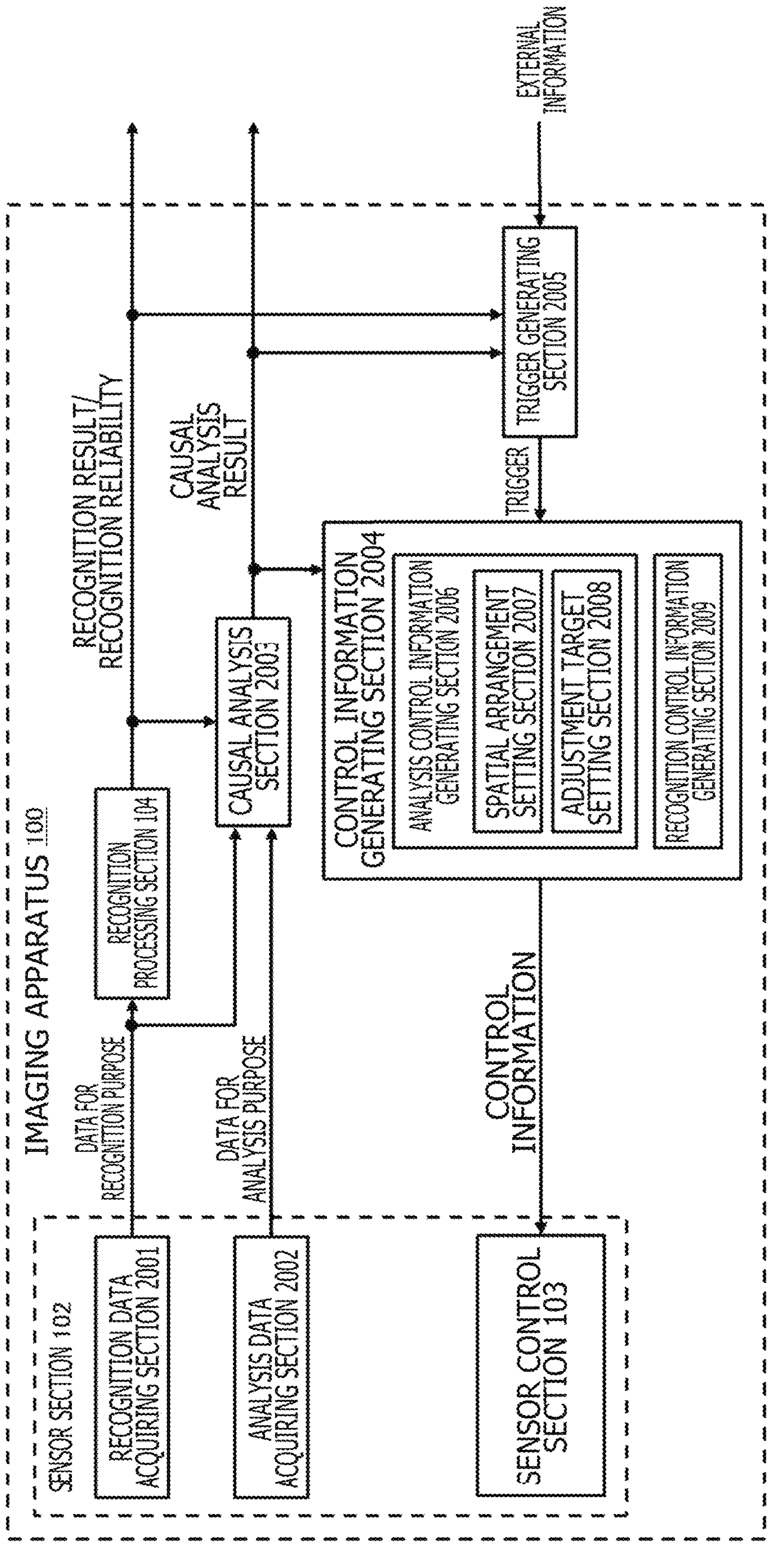
FIG. 20 is a diagram depicting an exemplary functional configuration of the imaging apparatus 100 that performs causal analysis of the result of recognition.

FIG. 20 schematically depicts an exemplary function configuration of the imaging apparatus 100 configured to analyze the cause of the drop in the recognition performance of the recognition processing section 104. As explained above in the foregoing paragraph A, the recognition processing section 104 performs recognition processing on the image captured by the sensor section 102 using a machine learning model constituted by a DNN such as a CNN or an RNN. Also, the drop in the recognition performance discussed here includes, specifically, the inability to recognize the object supposed to exist in the captured image and low reliability of recognition.

The imaging apparatus 100 in FIG. 20 includes a recognition data acquiring section 2001, an analysis data acquiring section 2002, a sensor control section 103, a recognition processing section 104, a causal analysis section 2003, a control information generating section 2004, and a trigger generating section 2005. It is to be noted that the imaging apparatus 100 here basically has the functional configuration illustrated in FIG. 1, the sensor section 102, the memory 105, the image processing section 106, the output control section 107, and the display section 108 are omitted in FIG. 20.

The recognition data acquiring section 2001 acquires, from the sensor section 102 (not depicted in FIG. 20), the image data for use by the recognition processing section 104 for ordinary recognition processing. Also, the analysis data acquiring section 2002 acquires, from the sensor section 102 (not depicted in FIG. 20), the image data for use by the causal analysis section 2003 in analyzing the cause of the drop in the recognition performance of the recognition processing section 104.

The sensor control section 103 controls the sensor characteristics of the sensor section 102 (resolution, line length, frame rate, shutter speed/exposure, etc.) on the basis of the control information supplied from the control information generating section 2004. Specifically, when the recognition data acquiring section 2001 is to acquire the image data from the sensor section 102, the sensor control section 103 controls the sensor characteristics of the sensor section 102 on the basis of the control information for recognition purpose supplied from the control information generating section 2004. When the analysis data acquiring section 2002 is to acquire the image data from the sensor section 102, the sensor control section 103 controls the sensor characteristics of the sensor section 102 on the basis of the control information for analysis purpose fed from the control information generating section 2004.

Whereas there are cases in which a whole single frame includes the image for analysis purpose, basically the image for analysis purpose including a pattern of lines or small pixel blocks is arranged in a portion of one frame (e.g., see FIGS. 13 through 19). Thus, on the basis of the spatial arrangement designated by the control information for analysis purpose supplied from the control information generating section 2004, the sensor control section 103 controls the sensor section 102 in such a manner that the image for analysis purpose for which the sensor characteristics have been adjusted is arranged within a predetermined partial region in one frame, the region being formed by a pattern of lines or pixel blocks.

The recognition processing section 104 receives input of the image data for recognition purpose acquired by the recognition data acquiring section 2001 from the sensor section 102, and performs recognition processing on objects in the image (human detection, facial identification, image categorization, etc.). As explained above in the foregoing paragraph A, the recognition processing section 104 performs recognition processing that uses a machine learning model constituted by a DNN such as a CNN or an RNN.

The causal analysis section 2003 analyzes the cause of the drop in the recognition performance of the recognition processing section 104 by use of the image data for recognition purpose acquired by the recognition data acquiring section 2001 from the sensor section 102 as well as the image data for analysis purpose obtained by the analysis data acquiring section 2002 from the sensor section 102. For example, the causal analysis section 2003 performs causal analysis from the viewpoint of information amount explained above in the foregoing paragraph C-1 as well as causal analysis from the viewpoint of the recognizer discussed above in the preceding paragraph C-2.

The control information generating section 2004 further includes an analysis control information generating section 2006 and a recognition control information generating section 2009.

The recognition control information generating section 2009 generates control information for the sensor section 102 and feeds the generated control information to the sensor control section 103 so that the recognition data acquiring section 2001 may acquire the image data for ordinary recognition processing (e.g., high-resolution low-bit-length image) from the sensor section 102. Basically, the recognition control information generating section 2009 performs a setup of the control information for ordinary recognition processing on the basis of the result of analysis by the causal analysis section 2003. That is, in a case where an acquired analysis result indicates that the performance of the sensor section 102 is the cause of the drop in the reliability of recognition by the recognition processing section 104, the recognition control information generating section 2009 searches for more appropriate control information so as to obtain an analysis result indicating that the performance of the sensor section 102 is no longer the cause of the drop in recognition reliability.

Also, the analysis control information generating section 2006 generates control information for the sensor section 102 and feeds the generated control information to the sensor control section 103 so that the analysis data acquiring section 2002 may acquire the image data for analysis purpose (e.g., low-resolution high-bit-length image) from the sensor section 102.

The image data for analysis purpose is basically arranged in a partial region within one frame, the region being formed by a pattern of predetermined lines or pixel blocks. Also, the image data for analysis purpose is an image in which one or a combination of at least two of the sensor characteristics of the sensor section 102 is set as the adjustment target. The analysis control information generating section 2006 thus further includes a spatial arrangement setting section 2007 that sets the spatial arrangement of the image data for analysis purpose and an adjustment target setting section 2008 that sets the adjustment target for the image data for analysis purpose. The analysis control information generating section 2006 generates the control information for analysis purpose including the spatial arrangement and the adjustment target set by the setting sections 2007 and 2008 respectively, and supplies the generated control information to the sensor control section 103.

The trigger generating section 2005 generates a control trigger for the control information generating section 2004. The trigger generating section 2005 generates the control trigger based on the recognition result or recognition reliability from the recognition processing section 104, on the result of analysis by the causal analysis section 2003, or on the external information supplied from the outside of the imaging apparatus 100. The trigger generating section 2005 supplies the generated trigger to the control information generating section 2004. Then, in response to the trigger supplied from the trigger generating section 2005, the analysis control information generating section 2006 starts or stops generation of the control information for analysis purpose, sets or changes the spatial arrangement of the image data for analysis purpose with the spatial arrangement setting section 2007, or sets or changes the adjustment target in the image data for analysis purpose with the adjustment target setting section 2008.

It is to be noted that the recognition data acquiring section 2001, an analysis data acquiring section 2002, and a sensor control section 103 may be included in the sensor section 102 to configure a single CMOS image sensor. Alternatively, the functional constituent elements depicted in FIG. 20 may all be included in the sensor section 102 to constitute one CMOS image sensor.

E-1. Causal Analysis

The causal analysis section 2003 analyzes the cause of the result of recognition by the recognition processing section 104 on the basis of the data for recognition purpose acquired by the recognition data acquiring section 2001 and the data for analysis purpose obtained by the analysis data acquiring section 2002.

As explained above in the foregoing paragraph C, the causal analysis section 2003 may perform at least either causal analysis from the viewpoint of information amount or causal analysis from the viewpoint of the recognizer.

In causal analysis from the viewpoint of information amount, the causal analysis section 2003 analyzes the cause of the result of recognition by the recognition processing section 104 by directing attention to the difference in information amount between the data for recognition purpose and the data for analysis purpose. For example, in a case where the high-resolution low-bit-length image is used as the data for recognition purpose and the low-resolution high-bit-length image is used as the data for analysis purpose, the difference between the linearly interpolated gradations of the low-bit-length image and the high-bit-length image is calculated to determine whether or not there is information invisible in the low-bit-length image (e.g., see FIG. 12). Also, the difference in information amount between the image for recognition purpose and the image for analysis purpose is utilized in determining through analysis that the bit length is the cause of the inability to recognize objects in the image for ordinary recognition processing.

Also, in causal analysis from the viewpoint of the recognizer, the causal analysis section 2003 performs recognition processing on the data for recognition purpose as well as on the data for analysis purpose. With attention directed to whether or not there is an inconsistency between the results of recognition of the two types of data, the causal analysis section 2003 analyzes the cause of the results of recognition performed by the recognition processing section 104. For example, in a case where the high-resolution low-bit-length image is used as the data for recognition purpose and the low-resolution high-bit-length image as the data for analysis purpose and where there is an inconsistency between the results of recognition of the two images, it is determined through analysis that there is information invisible in the low-bit-length information, i.e., that insufficient gradations are the cause of the inability to recognize objects.

Whereas the causal analysis from the viewpoint of information amount is liable to be affected by noise, the causal analysis from the viewpoint of the recognizer has an advantage of being resistant to the adverse effects of noise. However, the causal analysis from the viewpoint of the recognizer requires performing recognition processing on the image for ordinary recognition processing as well as on the image for causal analysis, which raises the problem of an increased amount of calculation.

E-2. Generation of Control Information

As described above, in the control information generating section 2004, the recognition control information generating section 2009 generates the control information for the sensor section 102 in order to acquire the image data for ordinary recognition processing (e.g., high-resolution low-bit-length image). Also, the analysis control information generating section 2006 generates the control information for the sensor section 102 to obtain the image data for analysis purpose (e.g., low-resolution high-bit-length image).

The analysis control information generating section 2006 generates the control information for having the image for causal analysis spatially arranged in the image for ordinary recognition processing. The spatial arrangement setting section 2007 sets the spatial arrangement of the image for analysis purpose on the basis of the result of analysis by the causal analysis section 2003. For example, the spatial arrangement setting section 2007 may set various spatial arrangements such as a spatial arrangement in which the image for analysis purpose is arranged in units of lines on the image for ordinary recognition processing, a spatial arrangement in which small image blocks for analysis purpose are arranged in a grid pattern on the image for ordinary recognition processing, or a spatial arrangement in which a pattern formed by an aggregate of small image blocks for analysis purpose is dynamically generated on the image for ordinary recognition processing (e.g., see FIGS. 13 through 19). Basically, on the basis of the result of recognition by the recognition processing section 104, the spatial arrangement setting section 2007 sets the spatial arrangement of the image data for analysis purpose in a manner focusing on analyzing the surroundings of the region in which objects are recognized.

Also, the analysis control information generating section 2006 generates the control information so as to control the adjustment target for the image data for analysis purpose. The adjustment target setting section 2008 sets the adjustment target for acquiring the image for analysis purpose from the sensor section 102 on the basis of the result of analysis by the causal analysis section 2003. In a case where the sensor section 102 is an image sensor, the sensor section 102 has characteristics such as resolution, bit length, frame rate, and shutter speed/exposure. The adjustment target setting section 2008 sets either one or a combination of at least two of such characteristics of the image sensor as the adjustment target.

Then, the analysis control information generating section 2006 then generates the control information for analysis purpose by combining the spatial arrangement with the adjustment target. The analysis control information generating section 2006 supplies the generated control information to the sensor control section 103.

For example, the analysis control information generating section 2006 may generate the control information for analysis purpose such that, in a case of the image sensor, one or a combination of at least two of the sensor characteristics of the sensor section 102 including resolution, bit length, frame rate, and shutter speed/exposure is set as the adjustment target for the image region for analysis purpose (for example, see FIGS. 13 through 16) spatially arranged on the image for ordinary recognition processing.

Further, the analysis control information generating section 2006 may generate the control information such that the spatial arrangement of the image data for analysis purpose is switched from one frame to another (e.g., see FIG. 17) or generate the control information such that the spatial arrangement of the image data for analysis purpose is switched within one frame (e.g., see FIGS. 18 and 19).

On the other hand, the recognition control information generating section 2009 generates the control information for the sensor section 102 so as to let the recognition data acquiring section 2001 acquire the image data for ordinary recognition processing (e.g., high-resolution low-bit-length image) from the sensor section 102. The recognition control information generating section 2009 supplies the generated control information to the sensor control section 103.

Basically, on the basis of the result of analysis by the causal analysis section 2003, the recognition control information generating section 2009 performs a setup of the control information for ordinary recognition processing. That is, given an analysis result indicating that the performance of the sensor section 102 is the cause of the drop in the recognition performance of the recognition processing section 104, the recognition control information generating section 2009 searches for more appropriate control information so as to obtain an analysis result indicating that the performance of the sensor section 102 is no longer the cause of the drop in recognition reliability.

E-3. Control Triggers

The trigger generating section 2005 generates a trigger based on the result or the reliability of recognition by the recognition processing section 104, on the result of analysis by the causal analysis section 2003, or on the external information supplied from the outside of the imaging apparatus 100. The trigger generating section 2005 supplies the generated trigger to the control information generating section 2004. Specifically, when the reliability of recognition by the recognition processing section 104 is low, when the causal analysis section 2003 outputs an analysis result indicating that the performance of the sensor section 102 is the cause of the drop in recognition reliability, or when the external information serving as a trigger is input, the trigger generating section 2005 generates a trigger and supplies it to the control information generating section 2004. The external information serving as a trigger for outputting the image for analysis purpose includes the surrounding environment of the imaging apparatus 100 (e.g., information regarding the surroundings of the vehicle carrying the imaging apparatus 100) and the input by the user of the instruction for causal analysis.

In response to the trigger supplied from the trigger generating section 2005, the analysis control information generating section 2006 in the control information generating section 2004 executes one of the following controls (1) through (4), for example.

(1) In response to the trigger, the output of the image for analysis purpose is started or stopped.

(2) In response to the trigger, the spatial arrangement of the image for analysis purpose is changed.

(3) In response to the trigger, the adjustment target for the image for analysis purpose is changed.

(4) In response to the trigger, the combination of the images for analysis purpose is changed.

E-4. Operations of Imaging Apparatus

The present paragraph E-4 explains the operations carried out by the imaging apparatus 100 having the function of analyzing the cause of the recognition result.

E-4-1. Operations of Ordinary Recognition Processing

Figure 21:
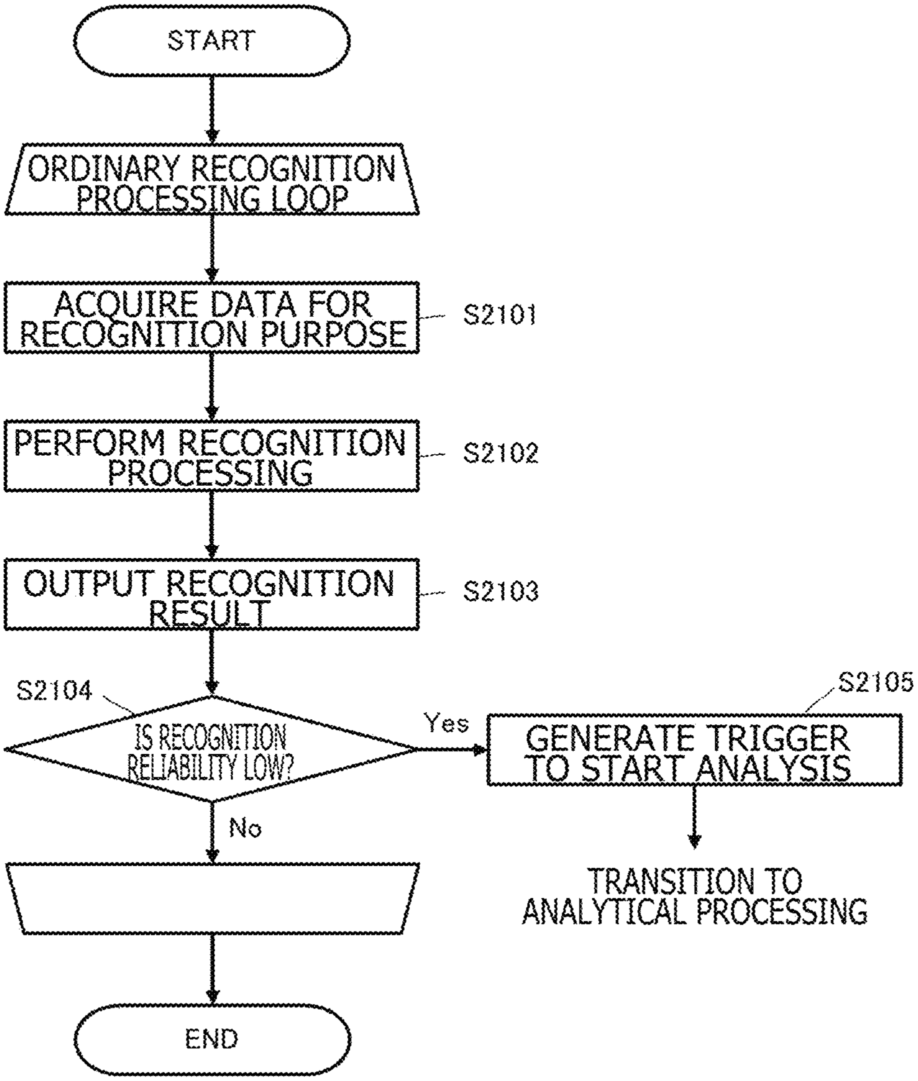

FIG. 21 depicts, in flowchart form, the processing steps carried out by the imaging apparatus 100 in FIG. 20 in performing ordinary recognition processing.

In carrying out the processing steps above, the sensor control section 103 is assumed to have set the sensor section 102 for the characteristics for ordinary recognition processing (resolution, bit length, frame rate, shutter speed/exposure, etc.) based on the control information for ordinary recognition processing generated by the recognition control information generating section 2009.

Then, the recognition data acquiring section 2001 acquires, from the sensor section 102 (not depicted in FIG. 20), the image data for use by the recognition processing section 104 for ordinary recognition processing (step S2101). The recognition processing section 104 receives input of the image data for recognition purpose acquired by the recognition data acquiring section 2001 from the sensor section 102, performs the process (step S2102) of recognizing objects in the image (human detection, facial identification, image categorization, etc.), and outputs the recognition result (step S2103).

The recognition result output from the recognition processing section 104 is assumed to include recognition reliability information in addition to the information regarding the objects recognized from the input image. Upon receipt of the recognition result, the trigger generating section 2005 checks whether or not the reliability of recognition is low (step S2104).

If the reliability of recognition is not low (No in step S2104), step S2101 is reached again. Steps S2101 through S2103 constituting the ordinary recognition processing are then repeated until the processing is terminated.

On the other hand, if the reliability of recognition is low (Yes in step S2104), the trigger generating section 2005 generates a trigger to start analyzing the cause of the drop in recognition reliability (step S2105). As a result of this, the imaging apparatus 100 interrupts the ordinary recognition processing and transitions to processing operations to analyze the cause of the drop in recognition reliability.

E-4-2. Operations to Output Data for Analysis Purpose

Figure 22:
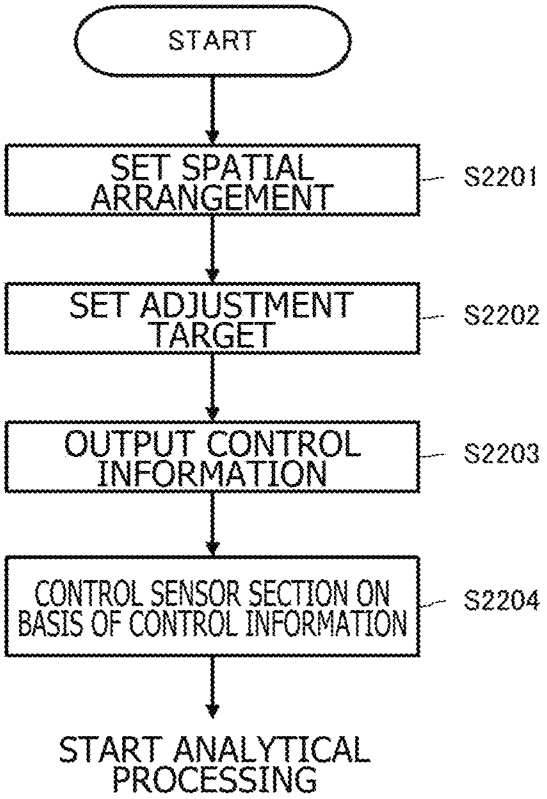
FIG. 22 is a flowchart indicating the steps performed by the imaging apparatus 100 in FIG. 20 to output image data for analysis purpose.

For example, when the trigger generating section 2005 generates the trigger to start analyzing the cause of the drop in recognition performance, the imaging apparatus 100 internally starts the process of outputting the data for analysis purpose. FIG. 22 depicts, in flowchart form, the processing steps carried out by the imaging apparatus 100 for outputting the image data for analysis purpose.

In the analysis control information generating section 2006, the spatial arrangement setting section 2007 sets the spatial arrangement of the image data for analysis purpose based on the result of analysis by the causal analysis section 2003 (step S2201). Also, on the basis of the result of analysis by the causal analysis section 2003, the adjustment target setting section 2008 sets those of the multiple characteristics of the sensor section 102 that serve as the adjustment target for outputting the image data for analysis purpose (step S2202).

The control information generating section 2004 then generates the control information for analysis purpose for the sensor section 102 on the basis of the spatial arrangement of the image data for analysis purpose set by the spatial arrangement setting section 2007 and the adjustment target set by the adjustment target setting section 2008. The control information generating section 2004 outputs the generated control information to the sensor control section 103 (step S2203).

On the basis of the control information for analysis purpose generated by the analysis control information generating section 2009, the sensor control section 103 controls the sensor section 102 to perform imaging with the characteristics for analysis purpose (resolution, bit length, frame rate, shutter speed/exposure, etc.) (step S2204).

As a result of carrying out the processing steps above, the analysis data acquiring section 2002 is able to acquire, from the sensor section 102, the image data for use by the causal analysis section 2003 in analyzing the cause of the drop in the recognition performance of the recognition processing section 104. The analysis data acquiring section 2002 then starts the process of analyzing the cause of the recognition result as will be discussed in the subsequent paragraph E-4-3.

E-4-3. Process of Analyzing Cause of Recognition Result

Figure 23:
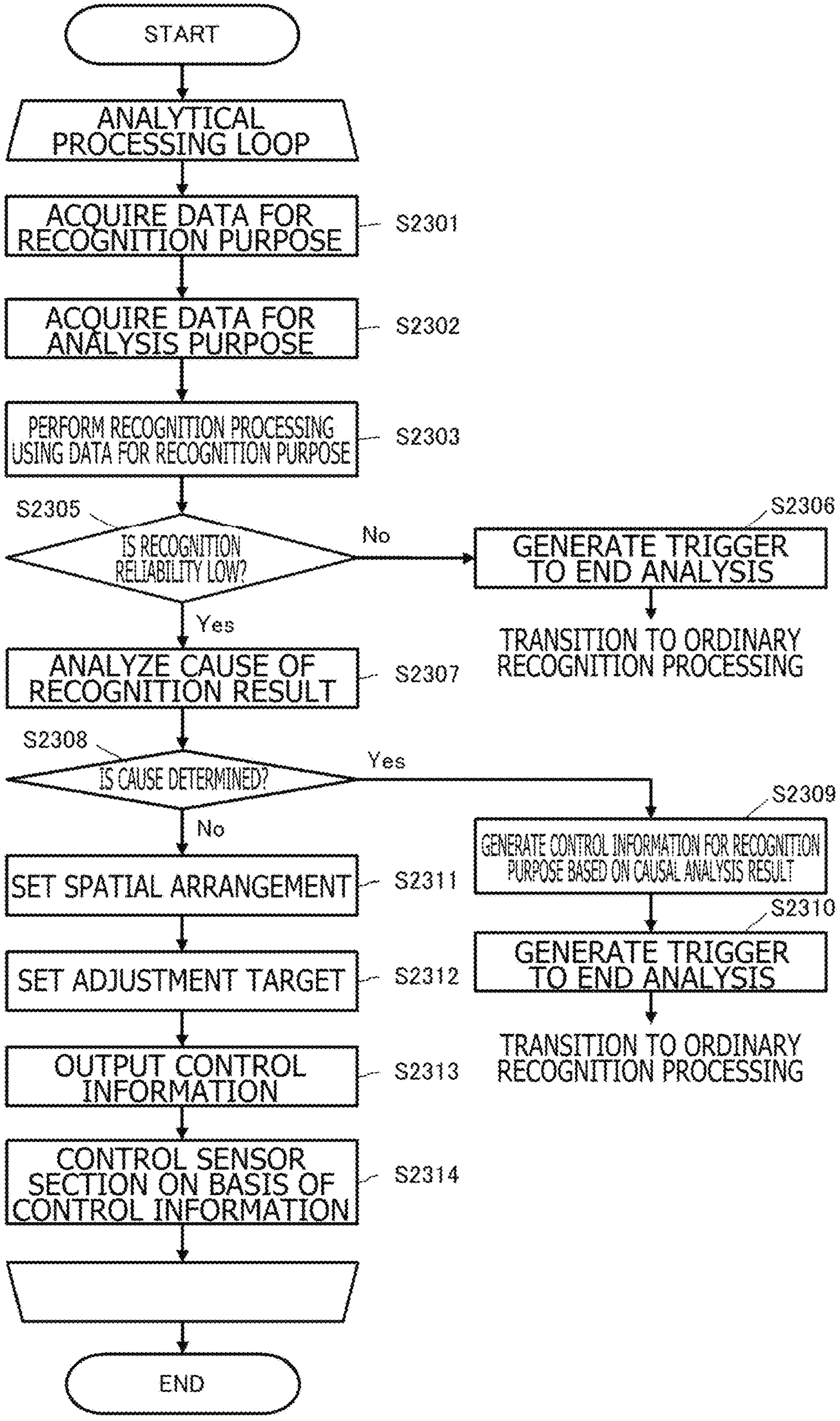
FIG. 23 is a flowchart indicating the steps performed by the imaging apparatus 100 in FIG. 20 to analyze the cause of the result of recognition.

As discussed above, in response to the trigger generating section 2005 generating the trigger, the imaging apparatus 100 internally starts the output of the data for analysis purpose and the process of analyzing the cause of the drop in recognition reliability. FIG. 23 depicts, in flowchart form, the processing steps carried out by the imaging apparatus 100 for analyzing the cause of the recognition result.

In carrying out the processing steps above, the sensor control section 103 is assumed to have set the sensor section 102 for the characteristics for analysis purpose (resolution, bit length, frame rate, shutter speed/exposure, etc.) based on the control information for analysis purpose generated by the analysis control information generating section 2006. It is also assumed below that the sensor section 102 outputs both the image for ordinary recognition processing and the image for analysis purpose, the latter image being formed in units of lines, in a grid pattern, or in a desired pattern when spatially arranged.

The recognition data acquiring section 2001 acquires, from the sensor section 102, the image data for use by the recognition processing section 104 for ordinary recognition processing (step S2301). The analysis data acquiring section 2002 acquires, from the sensor section 102, the image data for use by the causal analysis section 2003 in analyzing the cause of the result of recognition by the recognition processing section 104 (step S2302).

The recognition processing section 104 performs recognition processing on objects in the image (human detection, facial identification, image categorization, etc.) using the image data for recognition purpose acquired in step S2301 (step S2303), and outputs the recognition result (step S2304).

The recognition result output from the recognition processing section 104 is assumed to include recognition reliability information in addition to the information regarding the objects recognized from the input image. Upon receipt of the recognition result, the trigger generating section 2005 checks whether or not the reliability of recognition is low (step S2305).

If the reliability of recognition is not low (No in step S2305), the trigger generating section 2005 generates a trigger to end the analysis of the cause of the drop in recognition reliability (step S2306). As a result of this, the imaging apparatus 100 interrupts the causal analysis processing and transitions to the ordinary recognition processing indicated in FIG. 21.

On the other hand, if the reliability of recognition is low (Yes in step S2305), the causal analysis section 2003 analyzes the cause of the current result of recognition by the recognition processing section 104 or the cause of the drop in recognition reliability, using the image data for recognition purpose acquired by the recognition data acquiring section 2001 from the sensor section 102 and the image data for analysis purpose obtained by the analysis data acquiring section 2002 from the sensor section 102 (step S2307).

Here, when the causal analysis section 2003 is able to determine the cause of the current result of recognition by the recognition processing section 104 or the cause of the drop in recognition reliability (Yes in step S2308), the recognition control information generating section 2009 in the control information generating section 2004 performs a setup of the control information for ordinary recognition processing on the basis of the result of the causal analysis. That is, the recognition control information generating section 2009 changes the control information for ordinary recognition processing in a manner resolving the cause of the drop in recognition reliability (step S2310). The trigger generating section 2005 then generates a trigger to end the analysis of the cause of the drop in recognition reliability (step S2310). As a result of this, the imaging apparatus 100 interrupts the causal analysis processing and transitions to the ordinary recognition processing indicated in FIG. 21.

On the other hand, if the causal analysis section 2003 is unable to determine the cause of the current result of recognition by the recognition processing section 104 or the cause of the drop in recognition reliability (No in step S2308), the imaging apparatus 100 internally continues the current causal analysis processing.

In this case, the spatial arrangement setting section 2007 in the analysis control information generating section 2006 sets the spatial arrangement of the image data for analysis purpose based on the result of causal analysis by the causal analysis section 2003 (step S2311). Also, on the basis of the result of causal analysis by the causal analysis section 2003, the adjustment target setting section 2008 sets those characteristics of the sensor section 102 that serve as the adjustment target for outputting the image data for analysis purpose (step S2312).

The control information generating section 2004 then generates the control information for analysis purpose for the sensor section 102 on the basis of the spatial arrangement of the image data for analysis purpose set by the spatial arrangement setting section 2007 and the adjustment target set by the adjustment target setting section 2008. The control information generating section 2004 outputs the generated control information to the sensor control section 103 (step S2313).

On the basis of the control information for analysis purpose generated by the analysis control information generating section 2009, the sensor control section 103 controls the sensor section 102 to perform imaging with the characteristics for analysis purpose (resolution, bit length, frame rate, shutter speed/exposure, etc.) (step S2314).

As a result of carrying out the processing steps above, the analysis data acquiring section 2002 is able to acquire, from the sensor section 102, the image data for use by the causal analysis section 2003 in analyzing the cause of the drop in the recognition performance of the recognition processing section 104. The analysis data acquiring section 2002 then returns to step S2301 and continues the causal analysis processing.

E-4-4. Methods of Outputting Image Data for Analysis Purpose

Two methods can be used to output the image data for analysis purpose and include a method of outputting the image data for analysis purpose concurrently with the image data for ordinary recognition processing (e.g., see FIGS. 13 through 19), and a method of outputting only the image data for analysis purpose in accordance with a trigger.

According to the former method of outputting the image data for analysis purpose concurrently with the image data for ordinary recognition processing, there is an advantage of being able to perform causal analysis without time lag relative to the ordinary recognition processing. However, continuously outputting the image data for analysis purpose poses the problem of having to reduce that much the information regarding the image data for ordinary recognition.

On the other hand, according to the latter method of outputting the image data for analysis purpose in accordance with a predetermined trigger, there occurs the problem of a time lag between ordinary recognition processing and causal analysis. Still, with the image data for analysis purpose output only when needed, there is an advantage of there being practically no reduction in the information amount regarding the image data for ordinary recognition.

F. Application Fields

Figure 24:
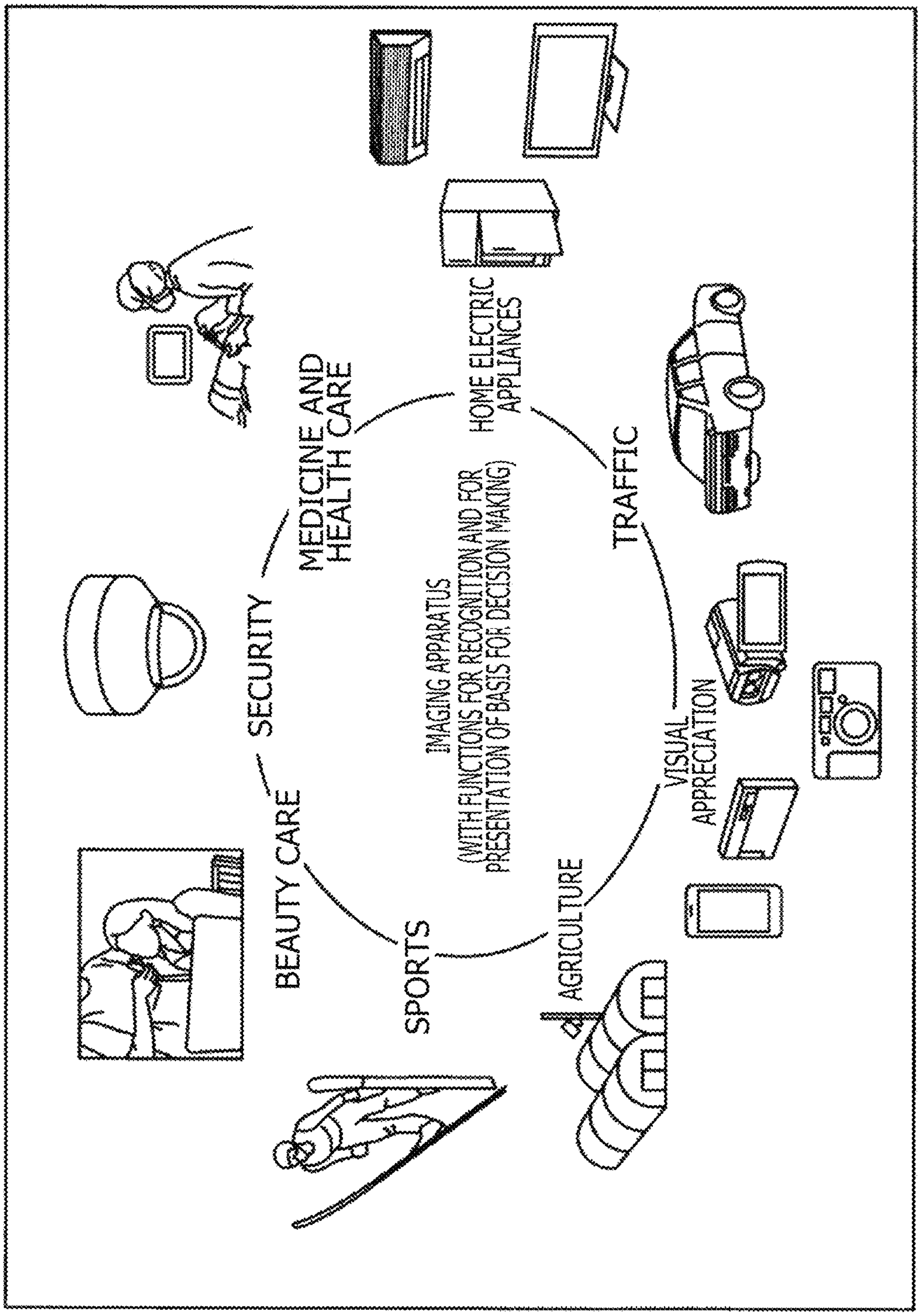
FIG. 24 is a diagram depicting application fields of the present disclosure.

Whereas the present disclosure is applicable to the imaging apparatus 100 for sensing primarily visible light, the disclosure may also be applied to apparatuses for sensing diverse kinds of light such as infrared rays, ultraviolet rays, and X-rays. The technology of the present disclosure may thus be applied in various fields with a view to analyzing the cause of the recognition result as well as the cause of recognition reliability. The control information for the sensor section 102 may be set up in a manner adapting to recognition processing on the basis of the result of such analysis. FIG. 24 summarizes the fields in which the technology of this disclosure can be applied.

(1) Visual Appreciation:

An applicable apparatus in this field is for use in visual appreciation, such as a digital camera and a mobile device equipped with a camera function.

(2) Traffic:

An applicable apparatus in this field is for traffic-related use, such as a vehicle-mounted sensor for taking images of the front, rear, surroundings, and interior of the vehicle, a surveillance camera for monitoring running vehicles and the road conditions, and a distance-measuring sensor for measuring vehicle-to-vehicle distances, the apparatus being used for safe driving through automatic stop and for recognizing the state of the driver, for example.

(3) Home Electric Appliances:

An applicable apparatus in this field is for use with home electric appliances such as a TV set, a refrigerator, an air conditioner, and a robot, the apparatus capturing images of a user's gestures and allowing the appliances to operate according to the captured gestures.

(4) Medicine and Health Care:

An applicable apparatus in this field is for use in medicine and health care, such as an endoscope and an instrument for capturing images of blood vessels under infrared light.

(5) Security:

An applicable apparatus in this field is for security-related use, such as a surveillance camera for crime prevention and a camera for personal authentication.

(6) Beauty Care:

An applicable apparatus in this field is for use in beauty care, such as a skin-measuring instrument for capturing images of the skin and a microscope for taking images of the scalp.

(7) Sports:

An applicable apparatus in this field is for use in sports, such as an action camera and a wearable camera for sporting purposes.

(8) Agriculture:

An applicable apparatus in this field is for agricultural use, such as a camera for monitoring fields and crop conditions.

(9) Production, Manufacture, and Service Industry:

An applicable apparatus in this field is for use in production, manufacture, and the service industry, such as a camera or a robot for monitoring the production, manufacture, and processing of goods or for supervising how services are offered.

G. Application Examples

The technology of the present disclosure may be applied to the imaging apparatus to be mounted on such mobile objects as automobiles, electric vehicles, hybrid electric vehicles, motorcycles, bicycles, personal mobility devices, aircraft, drones, ships, and robots.

Figure 25:
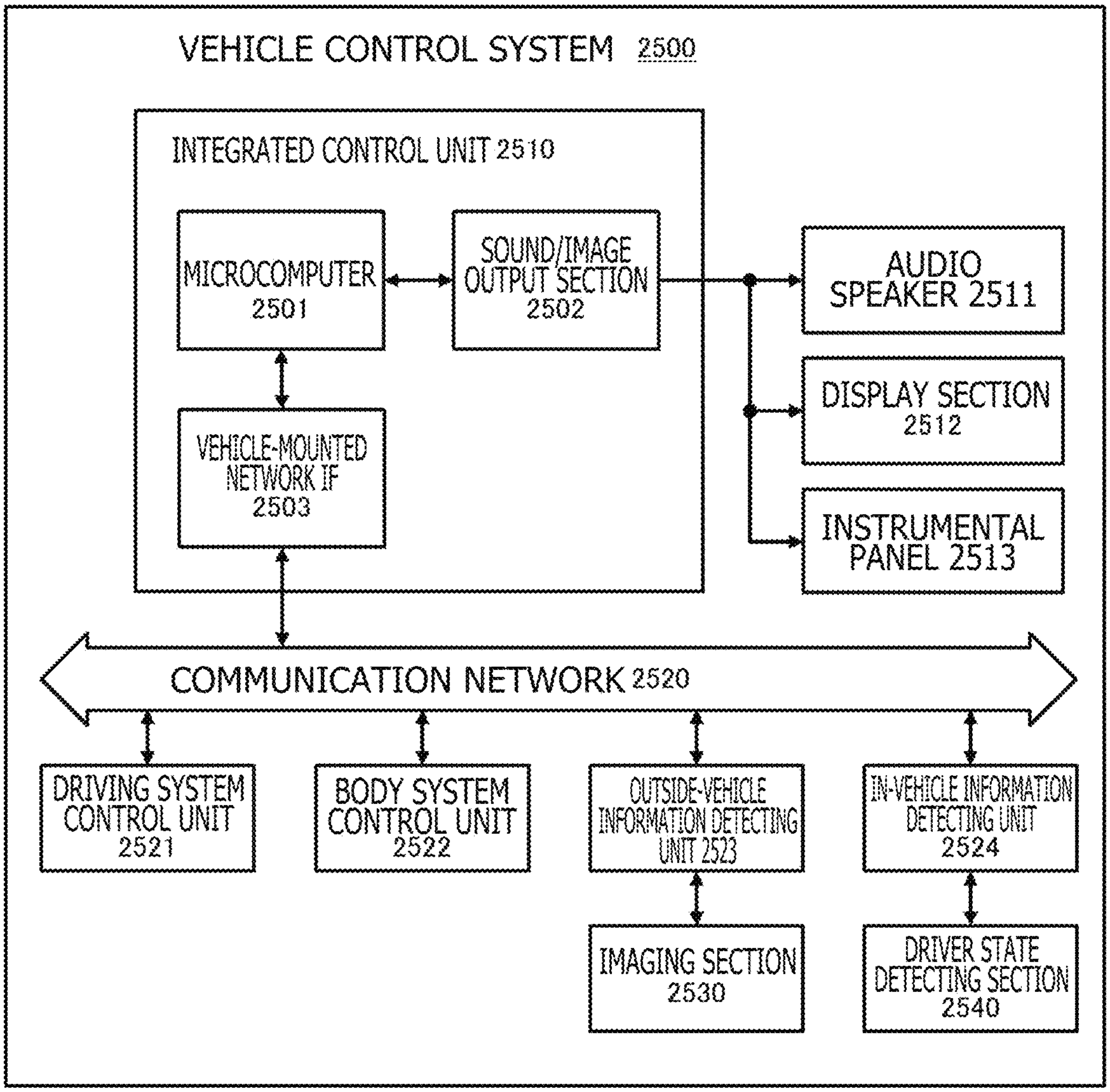
FIG. 25 is a diagram depicting an exemplary schematic configuration of a vehicle control system 2500.

FIG. 25 depicts a schematic configuration example of a vehicle control system 2500 exemplifying a mobile object control system to which the technology of the present disclosure may be applied.

The vehicle control system 2500 is equipped with multiple electronic control units interconnected via a communication network 2520. In the example indicated in FIG. 25, the vehicle control system 2500 includes a driving system control unit 2521, a body system control unit 2522, an outside-vehicle information detecting unit 2523, an in-vehicle information detecting unit 2524, and an integrated control unit 2510. The integrated control unit 2510 functionally includes a microcomputer 2501, a sound/image output section 2502, and a vehicle-mounted network interface I/F (interface) 2503 as illustrated.

The driving system control unit 2521 controls the operations of the apparatuses related to the driving system of the vehicle in accordance with various programs. For example, the driving system of the vehicle includes a drive power generation apparatus such as an internal combustion engine or a drive motor for generating the drive power of the vehicle, a drive power transmission mechanism for transmitting the drive power to the wheels, a steering mechanism for adjusting the steering angle of the vehicle, and a braking apparatus for generating the braking force of the vehicle. The driving system control unit 2521 functions as a control apparatus for controlling these components.

The body system control unit 2522 controls the operations of the apparatuses mounted on the vehicle body in accordance with various programs. For example, the vehicle body is equipped with a keyless entry system, a smart key system, and a power window device, as well as the lamps such as the head lamps, back lamps, brake lamps, blinkers, and fog lamps. The body system control unit 2522 functions as a control apparatus for controlling these devices mounted on the vehicle body. In this case, the body system control unit 2522 may receive input of radio waves or signals emitted by a portable device replacing the physical keys. Upon receipt of the radio waves or signal input, the body system control unit 2522 controls a door lock apparatus, the power window device, and the lamps of the vehicle.

The outside-vehicle information detecting unit 2523 detects information external to the vehicle equipped with the vehicle control system 2500. For example, the outside-vehicle information detecting unit 2523 is connected with an imaging section 2530. The outside-vehicle information detecting unit 2523 causes the imaging section 2530 to capture images of what is outside the vehicle and receive the captured images. On the basis of the images received from the imaging section 2530, the outside-vehicle information detecting unit 2523 may perform the process of detecting objects such as persons, vehicles, obstacles, traffic signs, and road surface markings, and of detecting the distances thereto. For example, the outside-vehicle information detecting unit 2523 processes the received images and, on the basis of the result of the image processing, carries out the object detection process and the distance detection process.

The outside-vehicle information detecting unit 2523 performs the object detection process using a learning model program trained beforehand to detect objects from the images. When the reliability of object detection is low, the outside-vehicle information detecting unit 2523 may analyze the cause of the low reliability and perform a setup of the control information for the imaging section 2530 on the basis of the result of the analysis.

The imaging section 2530 is an optical sensor that receives light and outputs an electrical signal representing the amount of the received light. The imaging section 2530 can output the electrical signal either as an image or as distance measurement information. The light received by the imaging section 2530 may be visible light or invisible light such as infrared light. The vehicle control system 2500 is assumed to have several imaging sections 2530 installed on the car body. The installation positions of the imaging section 2530 will be discussed later.

The in-vehicle information detecting unit 2524 detects information regarding the interior of the vehicle. For example, the in-vehicle information detecting unit 2524 is connected with a driver state detecting section 2540 for detecting the state of the driver. The in-vehicle information detecting unit 2524 may include a camera for capturing images of the driver, for example. On the basis of the detection information input from the driver state detecting section 2540, the in-vehicle information detecting unit 2524 may calculate the degree of fatigue or of concentration of the driver and determine whether the driver is nodding off. The driver state detecting section 2540 may further include biosensors for detecting biological information regarding the driver such as brain waves, pulse rate, body temperature, and breath.

On the basis of the inside- or outside-vehicle information obtained by the outside-vehicle information detecting unit 2523 or by the in-vehicle information detecting unit 2524, the microcomputer 2501 calculates control target values for the drive power generation apparatus, the steering mechanism, or the braking apparatus, and outputs control commands accordingly to the driving system control unit 2521. For example, the microcomputer 2501 can perform coordinated control to implement the functions of ADAS (Advanced Driver Assistance System) including collision avoidance and impact mitigation for the vehicle, follow-up driving based on the inter-vehicle distance, cruising, collision warning for the vehicle, and lane departure warning for the vehicle.

Also, the microcomputer 2501 can perform coordinated control to implement automated driving for autonomous travel free of driver intervention, by controlling the drive power generation apparatus, the steering mechanism, and the braking apparatus on the basis of vehicle environment information acquired by the outside-vehicle information detecting unit 2523 or by the in-vehicle information detecting unit 2524.

Further, on the basis of the outside-vehicle information acquired by the outside-vehicle information detecting unit 2523, the microcomputer 2501 can output control commands accordingly to the body system control unit 2522. For example, the microcomputer 2501 can perform coordinated control to switch from high to low beam for anti-glare purpose by controlling the head lamps in response to the position of the vehicle ahead or of the oncoming vehicle detected by the outside-vehicle information detecting unit 2523.

The sound/image output section 2502 transmits at least either a sound or an image as an output signal to an output apparatus capable of visually or audibly announcing information to the passengers on board the vehicle or to the outside of the vehicle. In the system configuration example in FIG. 25, an audio speaker 2511, a display section 2512, and an instrumental panel 2513 are provided as the output apparatus. The display section 2512 may include at least either an onboard display or a head-up display.

Figure 26:
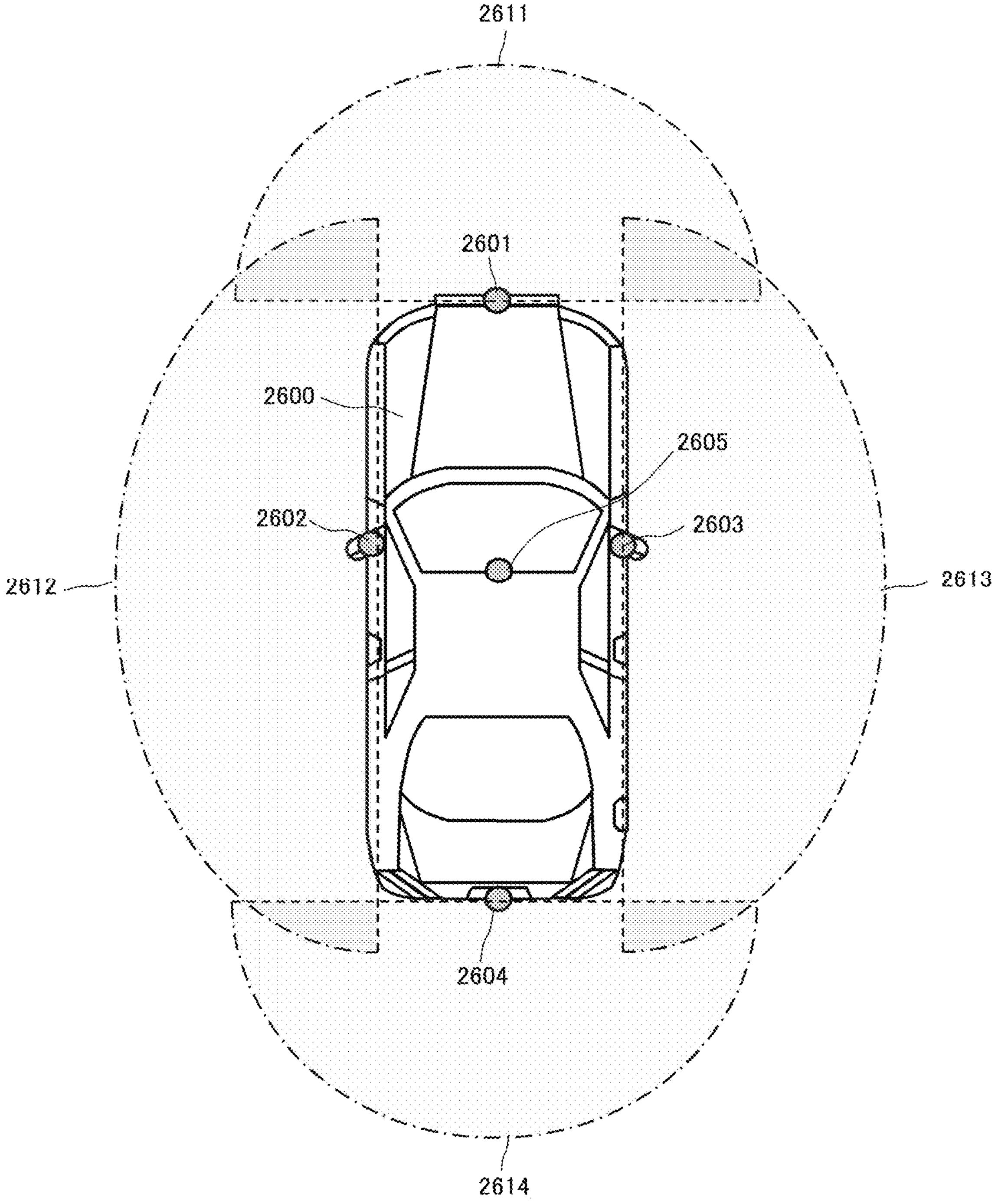
FIG. 26 is a diagram depicting exemplary installation positions of an imaging section 2530.

FIG. 26 depicts exemplary installation positions of the imaging sections 2530. In the example in FIG. 26, a vehicle 2600 has imaging sections 2601, 2602, 2603, 2604, and 2605 positioned as indicated to constitute the imaging sections 2530.

The imaging sections 2601, 2602, 2603, 2604, and 2605 are mounted, for example, on the front nose of the vehicle, on the side mirrors, on the rear bumper or on the back door, and on the windshield top inside the vehicle. The imaging section 2601 mounted on the front nose and the imaging section 2605 on the windshield top inside the vehicle primarily capture images of what is ahead of the vehicle 2600. The imaging sections 2602 and 2603 mounted on the left and right side mirrors primarily capture images of what is on the left and right sides of the vehicle 2600. The imaging section 2604 mounted on the rear bumper or on the back door primarily captures images of what is behind the vehicle 2600. The front side images captured by the imaging sections 2601 and 2605 are used primarily to detect the vehicle ahead, pedestrians, obstacles, traffic lights, traffic signs, lanes, and road surface signs.

FIG. 26 also illustrates imaging ranges of the imaging sections 2601 through 2604. The imaging range 2611 is covered by the imaging section 2601 mounted on the front nose. The imaging ranges 2612 and 2613 are covered, respectively, by the imaging sections 2602 and 2603 mounted on the side mirrors. The imaging range 2614 is covered by the imaging section 2604 mounted on the rear bumper or on the back door. For example, the image data acquired by the imaging sections 2601 through 2604 may be overlaid with one another to provide a bird's-eye view of the vehicle 2600.

At least one of the imaging sections 2601 through 2604 may be equipped with the function of acquiring distance information. For example, at least one of the imaging sections 2601 through 2604 may be a stereo camera formed by multiple imaging elements or an imaging element having pixels for phase difference detection.

For example, on the basis of the distance information obtained from the imaging sections 2601 through 2604, the microcomputer 2501 acquires the distance to each of the solid objects within the imaging ranges 2611 through 2614 as well as changes in the distance over time (relative velocity to the vehicle 2600). By so doing, the microcomputer 2501 is able to extract, as the vehicle ahead, a solid object traveling approximately in the same direction and on the same road as the vehicle 2600 at a predetermined speed (e.g., more than 0 km/h). Further, the microcomputer 2501 may set beforehand an inter-vehicle distance to be secured with respect to the vehicle ahead and instruct the body system control unit 2522 accordingly to perform automatic brake control (including follow-up stop control) and automatic acceleration control (including follow-up start control). In this manner, the vehicle control system 2500 can perform coordinated control to implement automated driving for autonomous travel free of driver intervention.

For example, on the basis of the distance information acquired from the imaging sections 2601 through 2604, the microcomputer 2501 is able to categorize solid object-related data into motorcycles, standard-sized vehicles, large-sized vehicles, pedestrians, utility poles, and other solid objects and extract the categorized objects for use in automatic avoidance of obstacles. For example, the microcomputer 2501 distinguishes the obstacles around the vehicle 2600 into those that are visible to the driver of the vehicle 2600 and those difficult for the driver to see. The microcomputer 2501 determines a collision risk, i.e., the level of risk of collision with each obstacle. In a situation where there is a possibility of collision because the collision risk is at or higher than a predetermined setting, the microcomputer 2501 may output a warning to the driver via the audio speaker 2511 or the display section 2512 or may cause the driving system control unit 2521 to perform forced deceleration or collision avoidance steering, thereby assisting the driver in avoiding collisions with the obstacles.

At least one of the imaging sections 2601 through 2604 may be an infrared ray camera that detects infrared light. For example, the microcomputer 2501 can recognize pedestrians by determining whether or not there are any pedestrians in the images captured by the imaging sections 2601 through 2604. Recognition of pedestrians is performed, for example, by a procedure of extracting feature points from the images captured by the imaging sections 2601 through 2604, and a procedure of carrying out pattern matching processing on a series of feature points indicative of object contours to see if a given object is a pedestrian. When the microcomputer 2501 determines that there is a pedestrian in the images captured by the imaging sections 2601 through 2604, the sound/image output section 2502 controls the display section 2512 to have rectangular contour lines displayed superimposed for emphasis on the recognized pedestrian. Also, the sound/image output section 2502 may control the display section 2512 to display an icon indicating the pedestrian in a desired position.

INDUSTRIAL APPLICABILITY

The present disclosure has been explained in detail with reference to a specific embodiment. The embodiment, however, may obviously be modified diversely or replaced with some other appropriate embodiments by those skilled in the art without departing from the spirit and scope of the disclosed technology.

The above description has centered primarily on how the present disclosure is applied to the imaging apparatus for sensing visible light as an embodiment of the present disclosure. However, the scope of this disclosure is not limited by what has been described above. It is possible similarly to apply the present disclosure to apparatus for sensing diverse kinds of light such as infrared light, ultraviolet light, and X-rays. The sensing apparatus embodying the disclosure analyzes the limitations of recognition performance attributable to sensor performance so that the characteristics of the sensor involved may be suitably set for the sensing apparatus to achieve higher recognition performance. Also, the technology of the present disclosure when applied to sensing apparatus in diverse fields permits analysis of the limitations of recognition performance attributable to sensor performance so that the characteristics of the sensor can be appropriately set for the sensing apparatus to attain higher recognition performance in the respective fields.

In brief, the present disclosure has been described above using examples and should not be interpreted restrictively in accordance therewith. The scope of the disclosure should thus be determined by the appended claims and their legal equivalents, rather than by the examples given.

It is to be noted that the present disclosure can also be implemented in the following configurations.

(1)

An information processing apparatus including:

a recognition processing section configured to perform object recognition processing on sensor information from a sensor section by use of a trained machine learning model;

a causal analysis section configured to analyze a cause of a result of recognition by the recognition processing section on the basis of the sensor information from the sensor section and the result of recognition by the reception processing section; and a control section configured to control an output of the sensor section.

(2)

The information processing apparatus according to (1) above, in which the control section controls the output of the sensor section on the basis of at least one of the result of recognition by the recognition processing section or a result of analysis by the causal analysis section.

(3)

The information processing apparatus according to (1) or (2) above, in which the sensor section has a first characteristic and a second characteristic, and the control section performs control to cause the sensor section to output either first sensor information having the first characteristic of high performance and the second characteristic of low performance or second sensor information having the first characteristic of low performance and the second characteristic of high performance.

(4)

The information processing apparatus according to any one of (1) to (3) above, in which the sensor section is an image sensor, and the control section performs control to cause the image sensor to output either high-resolution low-bit-length image data for ordinary recognition processing or low-resolution high-bit-length image data for causal analysis.

(5)

The information processing apparatus according to (4) above, in which the causal analysis section determines a cause of a drop in characteristic of recognition by the recognition processing section on the basis of the low-resolution high-bit-length image data for causal analysis.

(6)

The information processing apparatus according to any one of (1) to (5) above, further including:

a trigger generating section configured to generate a trigger for the control section to control the output of the sensor section.

(7)

The information processing apparatus according to (6) above, in which the trigger generating section generates the trigger on the basis of at least one of a result or reliability of recognition by the recognition processing section, a result of causal analysis by the causal analysis section, or external information supplied from an outside of the information processing apparatus.

(8)

The information processing apparatus according to any one of (1) to (7) above, in which the control section controls a spatial arrangement of a sensor output for analysis by the causal analysis section.

(9)

The information processing apparatus according to (8) above, in which the sensor section is an image sensor, and the control section controls a spatial arrangement of an image for analysis by the causal analysis section.

(10)

The information processing apparatus according to (9) above, in which the control section performs control to arrange the image for analysis purpose in units of lines on the image for ordinary recognition processing.

(11)

The information processing apparatus according to (9) above, in which the control section performs control to arrange the image for analysis purpose in a grid pattern of blocks on the image for ordinary recognition processing.

(12)

The information processing apparatus according to (9) above, in which the control section performs control to arrange the image for analysis purpose in a predetermined pattern on the image for ordinary recognition processing.

(13)

The information processing apparatus according to (9) above, in which, on the basis of the result of recognition by the recognition processing section, the control section dynamically generates the image for analysis purpose in a block pattern on the image for ordinary recognition processing.

(14)

The information processing apparatus according to any one of (1) to (13) above, in which the control section controls an adjustment target formed by at least one of multiple characteristics of the sensor section, the adjustment target being for use with a sensor output for analysis by the causal analysis section.

(15)

The information processing apparatus according to (14) above, in which the sensor section is an image sensor, and the control section has the adjustment target formed by at least one or a combination of at least two of the characteristics including resolution, bit length, frame rate, and shutter speed of the image sensor.

(16)

The information processing apparatus according to any one of (1) to (15) above, in which, on the basis of the result of analysis by the causal analysis section, the control section controls a setup of the sensor section for acquiring the sensor information for ordinary recognition processing by the recognition processing section.

(16-1)

The information processing apparatus according to (16) above, in which the sensor section is an image sensor, and the control section sets at least one or a combination of at least two of the characteristics including resolution, bit length, frame rate, and shutter speed of the image sensor for acquiring an image for ordinary recognition processing by the recognition processing section.

(17)

The information processing apparatus according to any one of (1) to (12) above, in which the sensor section is an image sensor, and the control section switches a sensor output for analysis by the causal analysis section at intervals of one frame or within one frame captured by the image sensor.

(18)

An information processing method including:

a recognition processing step of performing object recognition processing on sensor information from a sensor section by use of a trained machine learning model;

a causal analysis step of analyzing a cause of a result of recognition by the recognition processing section on the basis of the sensor information from the sensor section and the result of recognition by the reception processing section; and a control step of controlling an output of the sensor section.

(19)

A computer program described in a computer-readable format for causing a computer to function as:

a recognition processing section configured to perform object recognition processing on sensor information from a sensor section by use of a trained machine learning model;

a causal analysis section configured to analyze a cause of a result of recognition by the recognition processing section on the basis of the sensor information from the sensor section and the result of recognition by the reception processing section; and a control section configured to control an output of the sensor section.

(20)

A sensor apparatus including:

a sensor section;

a recognition processing section configured to perform object recognition processing on sensor information from a sensor section by use of a trained machine learning model;

a causal analysis section configured to analyze a cause of a result of recognition by the recognition processing section on the basis of the sensor information from an image sensor and the result of recognition by the reception processing section; and a control section configured to control an output of the image sensor, in which the sensor section, the recognition processing section, the causal analysis section, and the control section are integrated in a single semiconductor package.

REFERENCE SIGNS LIST

100: Imaging apparatus
101: Optical section
102: Sensor section
103: Sensor control section
104: Recognition processing section
105: Memory
106: Image processing section
107: Output control section
108: Display section
601: Pixel array section
602: Vertical scanning section
603: AD converting section
604: Horizontal scanning section
605: Pixel signal line
606: Control section
607: Signal processing section
610: Pixel circuit
611: AD converter
612: Reference signal generating section
2001: Recognition data acquiring section
2002: Analysis data acquiring section
2003: Causal analysis section
2004: Control information generating section
2005: Trigger generating section
2006: Analysis control information generating section
2007: Spatial arrangement setting section
2008: Adjustment target setting section
2009: Recognition control information generating section
2500: Vehicle control system
2501: Microcomputer
2502: Sound/image output section
2503: Vehicle-mounted network IF
2510: Integrated control unit
2511: Audio speaker
2512: Display section
2513: Instrumental panel
2520: Communication network
2521: Driving system control unit
2522: Body system control unit
2523: Outside-vehicle information detecting unit
2524: In-vehicle information detecting unit
2530: Imaging section
2540: Driver state detecting section

The invention claimed is:

1. An information processing apparatus, comprising:
circuitry configured to;
execute object recognition on sensor information from an image sensor by use of a trained machine learning model;
output a result of the object recognition based on the execution of the object recognition;
analyze a cause of the result of the object recognition based on the sensor information from the image sensor and the result of the object recognition; and
control the image sensor to output low-resolution high-bit-length image data for the analysis of the cause.

2. The information processing apparatus according to claim 1, wherein the circuitry is further configured to control the output of the image sensor based on at least one of the result of the object recognition or a result of the analysis of the cause.

3. The information processing apparatus according to claim 1, wherein
the image sensor has a first characteristic and a second characteristic, and
the circuitry is further configured to control the image sensor to output one of
first sensor information having the first characteristic and the second characteristic, wherein a performance of the first characteristic is higher than a performance of the second characteristic in the first sensor information, or
second sensor information having the first characteristic and the second characteristic, wherein the performance of the second characteristic is higher than the performance of the first characteristic in the second sensor information.

4. The information processing apparatus according to claim 1, wherein
the circuitry is further configured to control the image sensor to output high-resolution low-bit-length image data for an ordinary recognition process.

5. The information processing apparatus according to claim 1, wherein the circuitry is further configured to determine a cause of a drop in characteristic of the object recognition based on the low-resolution high-bit-length image data for the analysis of the cause.

6. The information processing apparatus according to claim 1, wherein the circuitry is further configured to generate a trigger to control the output of the image sensor.

7. The information processing apparatus according to claim 6, wherein the circuitry is further configured to generate the trigger based on at least one of the result or reliability of the object recognition, a result of the analysis of the cause, or external information supplied from an outside of the information processing apparatus.

8. The information processing apparatus according to claim 1, wherein the circuitry is further configured to control a spatial arrangement of the output of the image sensor for the analysis of the cause.

9. The information processing apparatus according to claim 8, wherein
the circuitry is further configured to control a spatial arrangement of a first image for the analysis of the cause.

10. The information processing apparatus according to claim 9, wherein the circuitry is further configured to control an arrangement of the first image for the analysis of the cause in units of lines on a second image, and wherein the second image is for an ordinary recognition process.

11. The information processing apparatus according to claim 9, wherein the circuitry is further configured to arrange the first image for the analysis of the cause in a grid pattern of blocks on a second image, and wherein the second image is for an ordinary recognition process.

12. The information processing apparatus according to claim 9, wherein the circuitry is further configured to arrange the first image for the analysis of the cause in a specific pattern on a second image, and wherein the second image is for an ordinary recognition process.

13. The information processing apparatus according to claim 9, wherein, based on the result of the object recognition, the circuitry is further configured to dynamically generate the first image for the analysis of the cause in a block pattern on a second image, and wherein the second image is for an ordinary recognition process.

14. The information processing apparatus according to claim 1, wherein
the circuitry is further configured to control an adjustment target,
the adjustment target is based on at least one of a plurality of characteristics of the image sensor, and
the adjustment target is for use with the output of the image sensor for the analysis of the cause.

15. The information processing apparatus according to claim 14, wherein
the circuitry is further configured to control the adjustment target based on at least one or a combination of at least two of the plurality of characteristics including resolution, bit length, frame rate, and shutter speed of the image sensor.

16. The information processing apparatus according to claim 1, wherein, based on a result of the analysis of the cause, the circuitry is further configured to control a setup of the image sensor to acquire the sensor information for an ordinary recognition process.

17. The information processing apparatus according to claim 1, wherein
the circuitry is further configured to switch the output of the image sensor output for the analysis of the cause at intervals of one of one frame or within the one frame captured by the image sensor.

18. An information processing method, comprising:
executing, by circuitry, object recognition on sensor information from an image sensor by use of a trained machine learning model;
outputting, by the circuitry, a result of the object recognition based on the execution of the object recognition;
analyzing, by the circuitry, a cause of the result of the object recognition based on the sensor information from the image sensor and the result of the object recognition; and
controlling, by the circuitry, the image sensor to output low-resolution high-bit-length image data for the analysis of the cause.

19. A non-transitory computer-readable medium having stored thereon, computer-executable instructions which, when executed by a computer, cause the computer to execute operations, the operations comprising:
executing object recognition on sensor information from an image sensor by use of a trained machine learning model;
outputting a result of the object recognition based on the execution of the object recognition;
analyzing a cause of the result of the object recognition based on the sensor information from the image sensor and the result of the object recognition; and controlling the image sensor to output low-resolution high-bit-length image data for the analysis of the cause.

20. A sensor apparatus, comprising:

an image sensor; and circuitry configured to:

execute object recognition on sensor information from the image sensor by use of a trained machine learning model;

output a result of the object recognition based on the execution of the object recognition;

analyze a cause of the result of the object recognition based on the sensor information from the image sensor and the result of the object recognition; and control the image sensor to output low-resolution high-bit-length image data for the analysis of the cause, wherein the image sensor and the circuitry are integrated in a single semiconductor package.

* * * * *